United States Patent [19]
Britnell

[11] Patent Number: 5,925,268
[45] Date of Patent: Jul. 20, 1999

[54] LASER WELDING APPARATUS EMPLOYING A TILTING MECHANISM AND SEAM FOLLOWER

[75] Inventor: James W. Britnell, Harrow, Canada

[73] Assignee: Engauge Inc., Windsor, Canada

[21] Appl. No.: 08/677,092

[22] Filed: Jul. 9, 1996

Related U.S. Application Data

[63] Continuation-in-part of application No. 08/659,634, Jun. 6, 1996.

[51] Int. Cl.$^6$ .................................................. B23K 26/04
[52] U.S. Cl. ............................... 219/121.63; 219/121.79; 219/121.83
[58] Field of Search ........................... 219/121.6, 121.63, 219/121.64, 121.67, 121.76, 121.78, 121.79, 121.8, 121.81, 121.82, 121.83

[56] References Cited

U.S. PATENT DOCUMENTS

| | | |
|---|---|---|
| 4,008,384 | 2/1977 | Cecil ................................. 219/124.33 X |
| 4,223,202 | 9/1980 | Peters et al. .......................... 219/121.6 |
| 4,316,075 | 2/1982 | Isoya et al. . |
| 4,316,076 | 2/1982 | Balfanz . |
| 4,367,017 | 1/1983 | Jimbou et al. . |
| 4,380,696 | 4/1983 | Masaki . |
| 4,436,288 | 3/1984 | Kellogg et al. . |
| 4,621,185 | 11/1986 | Brown . |
| 4,673,795 | 6/1987 | Ortiz, Jr. ............................... 219/121.6 |
| 4,677,274 | 6/1987 | Bisiach . |
| 4,691,093 | 9/1987 | Banas et al. . |
| 4,855,564 | 8/1989 | Hawkins et al. . |
| 4,899,924 | 2/1990 | Kawaguchi .......................... 219/121.63 |
| 4,969,108 | 11/1990 | Webb et al. . |
| 4,972,062 | 11/1990 | Aharon . |
| 5,001,324 | 3/1991 | Aiello et al. ......................... 219/121.63 |
| 5,045,668 | 9/1991 | Neiheisel et al. ................... 219/121.83 |
| 5,059,759 | 10/1991 | Kudo et al. .......................... 219/121.78 |
| 5,168,141 | 12/1992 | Tashijan et al. . |
| 5,190,204 | 3/1993 | Jack et al. . |
| 5,204,505 | 4/1993 | Prange et al. . |
| 5,229,571 | 7/1993 | Neiheisel . |

(List continued on next page.)

FOREIGN PATENT DOCUMENTS

| | | | |
|---|---|---|---|
| 61-27191 | 2/1986 | Japan ................................ 219/121.85 |
| 63-154283 | 6/1988 | Japan ................................ 219/121.64 |
| 6-71470 | 3/1994 | Japan ................................ 219/121.78 |
| 95/16540 | 6/1995 | WIPO ............................... 219/121.63 |

OTHER PUBLICATIONS

Official Publication of ESD, Engineering Society, "Technology", Apr./May 1996, Entire publication.
Photographs of Chuo Seiki part (prior to Apr. 1996).
Photographs of linear slides (prior to Apr. 1996).
Several Servo Robot Brochures (prior to Jun. 1996).

*Primary Examiner*—Gregory Mills
*Attorney, Agent, or Firm*—Harness, Dickey & Pierce, P.L.C.

[57] ABSTRACT

In general, the present invention pertains to an apparatus and control system for working sheet material employs a tilting mechanism which automatically tilts a head about a theoretical point disposed upon the sheet material. In another aspect of the present invention, the head is defined as a laser head and the pivot point corresponds with the laser beam focal point. A further aspect of the present invention provides a seam tracking device and control system which automatically adjust a welding head height relative to the sheet material as a datum rather than relative to a gantry or other structure supporting the welding head. In yet another aspect of the present invention, an optical seam tracking device is employed to automatically tilt the welding head along differing rotational planes. In still another aspect of the present invention, various axial slides are employed in combination with a gantry. A further aspect of the present invention uses a seam tracking device and microprocessor to track a welding seam and move a welding head predetermined amounts due to sensed pre-weld gap widths. Another aspect of the present invention uses an automated tilting mechanism for creating a tailored blank butt weld between dissimilar materials. A method of operating the present invention is also provided.

15 Claims, 17 Drawing Sheets

U.S. PATENT DOCUMENTS

| | | |
|---|---|---|
| 5,272,312 | 12/1993 | Jurca . |
| 5,347,528 | 9/1994 | Haruta et al. .................. 219/121.64 X |
| 5,375,011 | 12/1994 | Normandin et al. . |
| 5,380,978 | 1/1995 | Pryor . |
| 5,428,280 | 6/1995 | Schmidt et al. . |
| 5,434,880 | 7/1995 | Burrows et al. . |
| 5,471,541 | 11/1995 | Burtnyk et al. . |
| 5,591,360 | 1/1997 | Mombo-Caristan ............... 219/121.64 |
| 5,685,999 | 11/1997 | Wiedemann et al. .............. 219/121.83 |

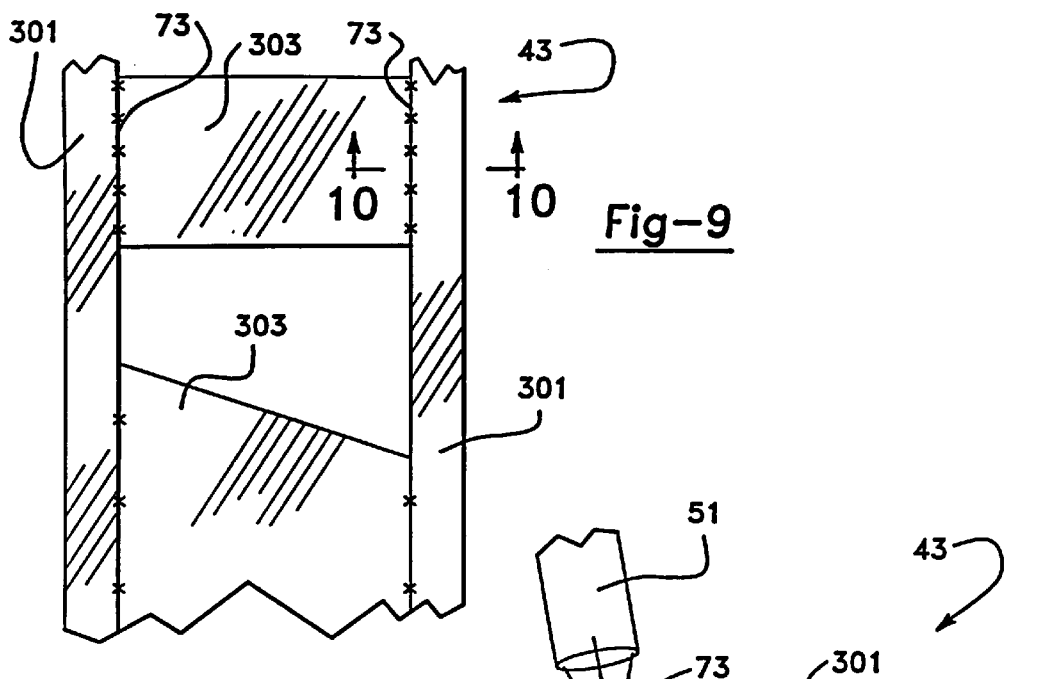
Fig-9
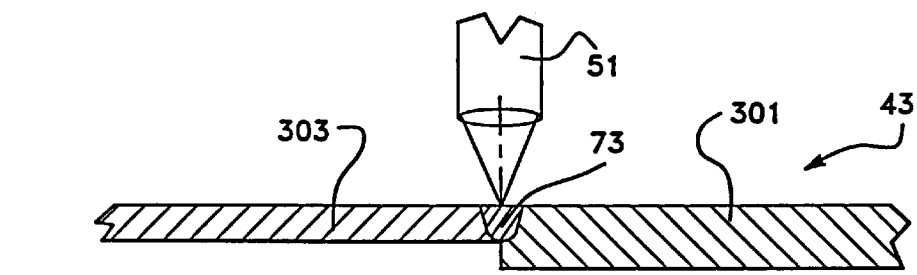
Fig-10
Fig-11
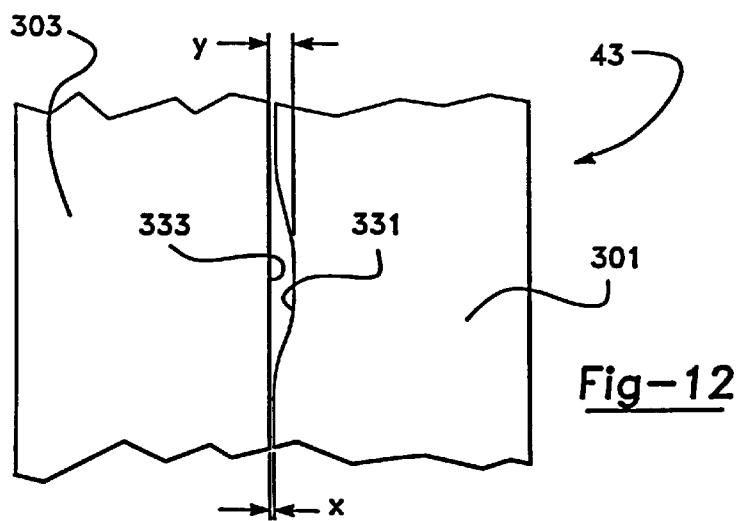
Fig-12

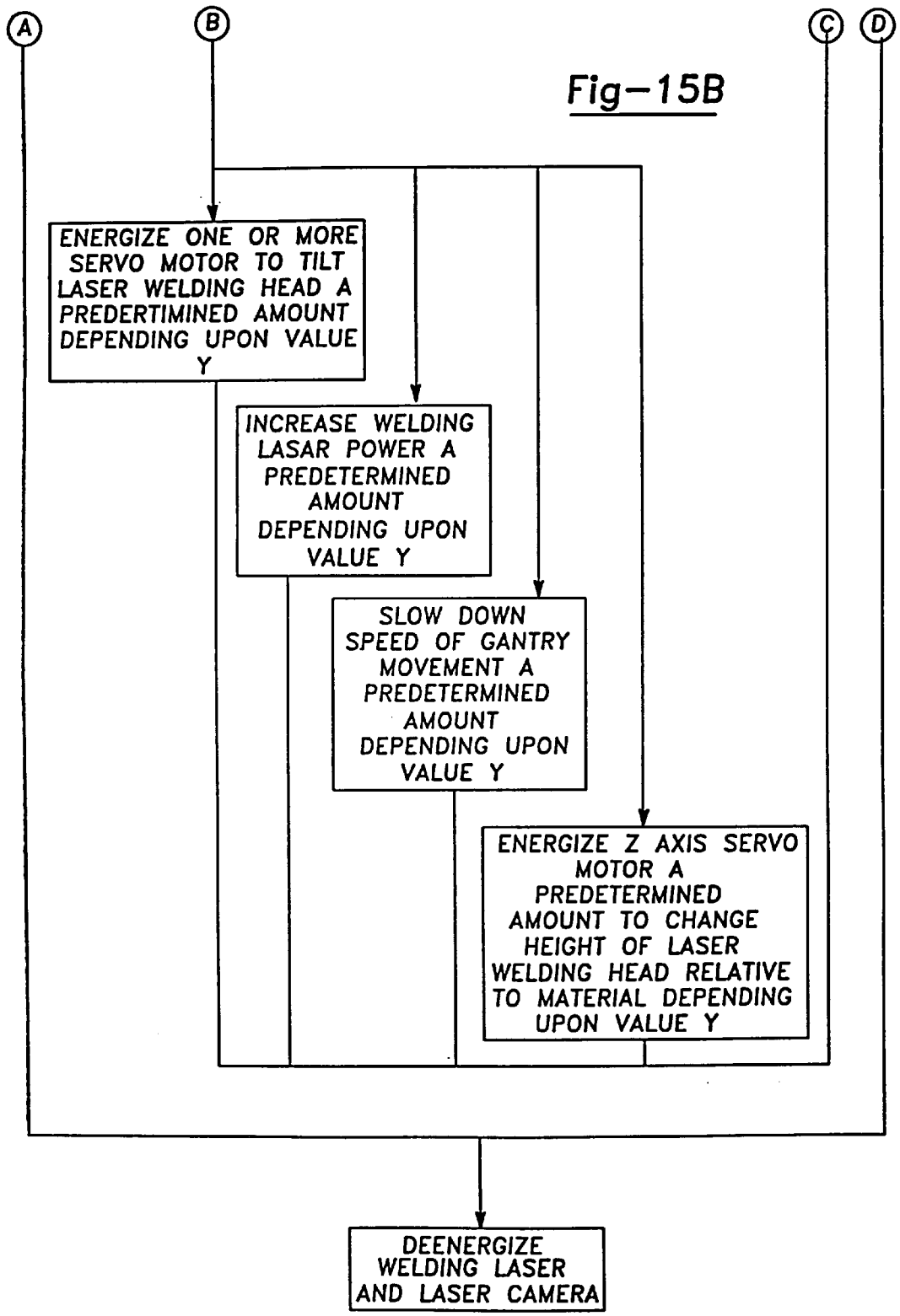

LASER WELDING APPARATUS EMPLOYING A TILTING MECHANISM AND SEAM FOLLOWER

CROSS-REFERENCE TO RELATED APPLICATIONS

This application is a Continuation-In-Part of U.S. application Ser. No. 08/659,634, filed Jun. 6, 1996.

BACKGROUND OF THE INVENTION

This invention relates generally to an apparatus and control system for working sheet material and more specifically to a machine, control system and method for laser welding employing a tilting mechanism and a seam tracking device.

It is common to employ a welding or cutting head in combination with an articulating robot arm or a moving gantry. However, most articulating robots suffer from a lack of precision and stability due to their inherent heavy moment arms extending a significant distance from their stationary bases. Furthermore, articulating robots usually only have a static movement accuracy of +/−100 microns, at best. This lack of accuracy and lack of stability detrimentally affects welding and cutting precision of a head mounted on the arm's end. In contrast, gantries tend to be more stable and thus more accurate than articulating robots, but usually require significantly expensive concrete reinforcement within the gantry and difficult to achieve bridge machining tolerances. Notwithstanding, the gantry bridges are still somewhat imprecise due to machining tolerances.

To account for these tolerance and accuracy variations, optical seam tracking cameras and sensors have been recently used for various welding processes including gas metal arc welding, gas tungsten arc welding, plasma arc welding, submerged arc welding, flux-cord arc welding and laser beam welding. One such system is produced by Servo-Robot Inc. of Boucherville, Quebec, Canada. Other examples of such three dimensional vision seam sensing systems are disclosed in the following U.S. Pat. Nos. 5,168,141 entitled "Vision Guided Laser Welding" which issued to Tashjian et al. on Dec. 1, 1992; 4,969,108 entitled "Vision Seam Tracking Method and Apparatus for a Manipulator" which issued to Webb et al. on Nov. 6, 1990; and 4,621,185 entitled "Adaptive Welding Apparatus having Fill Control Correction for Curvilinear Weld Grooves" which issued to Brown on Nov. 4, 1986; all of which are incorporated by referenced herewithin. Most welding and cutting gantry devices employing optical sensing use the somewhat imprecise bridge as the Z axis (vertical) datum and accordingly automatically adjust a Z axis movement device. For articulating robots, each joint is moved to correlate Z axis changes in relation to the fixed base. A more traditional capacitive sensor has also been used to sense the distance between a welding head and the workpiece material. Such a capacitive sensor is disclosed within U.S. Pat. No. 5,428,280 entitled "Robotic Movement of Object over a Workpiece Surface" which issued to Schmidt et al. on Jun. 27, 1995, and is incorporated by reference herewithin.

Laser welding and cutting with a $CO_2$ laser or a Yag laser are also becoming commonplace. Laser welding is highly advantageous over other types of welding methods since laser welding allows for deep and high speed welding without requiring the difficult to handle and somewhat costly filler material. Furthermore, laser welding devices are significantly less expensive as compared to other types of welding equipment. However, traditional laser welding and cutting systems use indexed turning or steering mirrors to redirect the laser beam along a curved workpiece or seam. Such mirrored systems are disclosed within the following U.S. Pat. Nos.: 4,972,062; 4,855,564; 4,677,274; and 4,367,017. The necessity to rotate these types of mirrors about the laser beam requires complicated and costly computer programming while also being somewhat prone to damage in the workpiece environment. Furthermore, such redirecting mirrors also provide additional tolerance inaccuracies and tend to collect airborne debris. Additionally, a fixed pivot point positioned on or above the laser in traditional systems causes focal length and focal point inaccuracies in relation to the workpiece material when the laser is initially oriented or moved relative to the workpiece surface; this is the scenario disclosed in U.S. Pat. No. 5,190,204.

Moreover, a large pre-weld gap between adjacent sheet material edges typically prevents adequate laser butt welding. This problem is usually observed with pre-weld gaps having a material edge-to-edge dimension greater than 10 percent of the material thickness. The welding machine is shut off and the material is scrapped if the maximum gap width is present. Such a gap problem is recognized in U.S. Pat. No. 5,204,505. Accordingly, it would be desirable to provide a laser welding apparatus and control system employing an improved, accurate and automated mechanism for welding across a large seam gap.

SUMMARY OF THE INVENTION

In accordance with the present invention, the preferred embodiment of an apparatus and control system for working material employs a tilting mechanism which automatically tilts a head about a theoretical point disposed upon the sheet material. In another aspect of the present invention, the head is defined as a laser head and the pivot point corresponds with the laser beam focal point. A further aspect of the present invention provides a seam tracking device and control system which automatically adjust a welding head height relative to the sheet material as a datum rather than relative to a gantry or other structure supporting the welding head. In yet another aspect of the present invention, an optical seam tracking device is employed to automatically tilt the welding head along differing rotational planes. In still another aspect of the present invention, various axial slides are employed in combination with a gantry. A further aspect of the present invention uses a seam tracking device and microprocessor to track a welding seam and move a welding head predetermined amounts due to sensed pre-weld gap widths. Another aspect of the present invention uses an automated tilting mechanism for creating a tailored blank butt weld between dissimilar materials. An additional axis, controlled by the weld head processor may move or rotate a laser optic to orient a double spot optic to either increase welding speed or cover a larger area across the gap to ensure both metal sheets are melted. Also if two lasers are used (one for each spot), the weld head processor may selectively rise or lower each respective laser's power, or change one or both lasers to pulse mode from continuous wave mode. Moreover, in a further aspect of the present invention, an automatically adjusting laser is used to create tailored blank welds. Generally, tailored blank welds are essentially butt welds between pre-cut or previously blanked-out sheets of material of similar or dissimilar materials types and/or thicknesses. A method of operating the present invention is also provided.

The laser welding apparatus and control system of the present invention have many advantages over traditional systems. For example, the automated nature of the present invention tilting mechanism, the closed-loop, actual condition sensing seam tracking device and the microprocessors allow for uninterrupted continuous welding along an arcuate seam regardless of even large seam gap widths. This automated tilting control system significantly lowers work material rejection, set-up time, operating time and operating costs while improving weld uniformity along material sheets having wide edge tolerances. Another advantage is the ability to rotate split laser beams in an automated manner. An integral electromagnetic laser optic member movement mechanism further aids welding across a large gap seam.

The present invention tilting mechanism is also very cost effective, evenly balanced, dimensionally stable and extremely precise. Furthermore, the present invention tilting mechanism is extremely robust and resistant to abuse and environmental debris. The apparatus of the present invention is further advantageous by accurately maintaining the focal length of the laser beam such that the focal point is always maintained upon the desired workpiece seam location regardless of the tilted positioning of the laser optic. Another advantage of the apparatus of the present invention is that it can be tilted to weld across a pre-weld gap between adjacent sheet material edges even if the pre-weld gap is between 10 and 15% of the sheet material thickness. The present invention apparatus offers another advantage by being especially suitable for use in tailored blank butt welding of dissimilar material thicknesses or material types by providing a mechanism for accurately tilting the laser head in relation to the stepped sheet material seam. By tilting the laser head of the present invention, the harmful reflected laser beam is angularly offset from the incident laser beam emanating from the welding or cutting laser head. As another advantage, the present invention uses the sheet material and seam as datums thereby allowing wider and less costly tolerances and stiffness requirements within the bridge and gantry. In general, gantry systems provide static precision movement within +/−25 microns thereby offering superior accuracy relative to articulating robots. Additional advantages and features of the present invention will become apparent from the following description and appended claims, taken in conjunction with the accompanying drawings.

BRIEF DESCRIPTION OF THE DRAWINGS

FIG. 9 is a top elevational view showing a tailored blank weld in the sheet material welded by the preferred embodiment laser welding apparatus and control system of the present invention;

FIG. 10 is a cross sectional view, taken along line 10—10 of FIG. 9, showing the tailored blank weld in the sheet material welded by the preferred embodiment laser welding apparatus and control system of the present invention;

FIG. 11 is a cross sectional view, similar to that shown in FIG. 10, showing an alternate orientation of the tailored blank weld welded by the preferred embodiment laser welding apparatus and control system of the present invention;

FIG. 12 is a top elevational view showing gap conditions between edges of adjacent sheets of material prior to being welded by the preferred embodiment laser welding apparatus and control system of the present invention;

DETAILED DESCRIPTION OF THE PREFERRED EMBODIMENT

Figure 1:
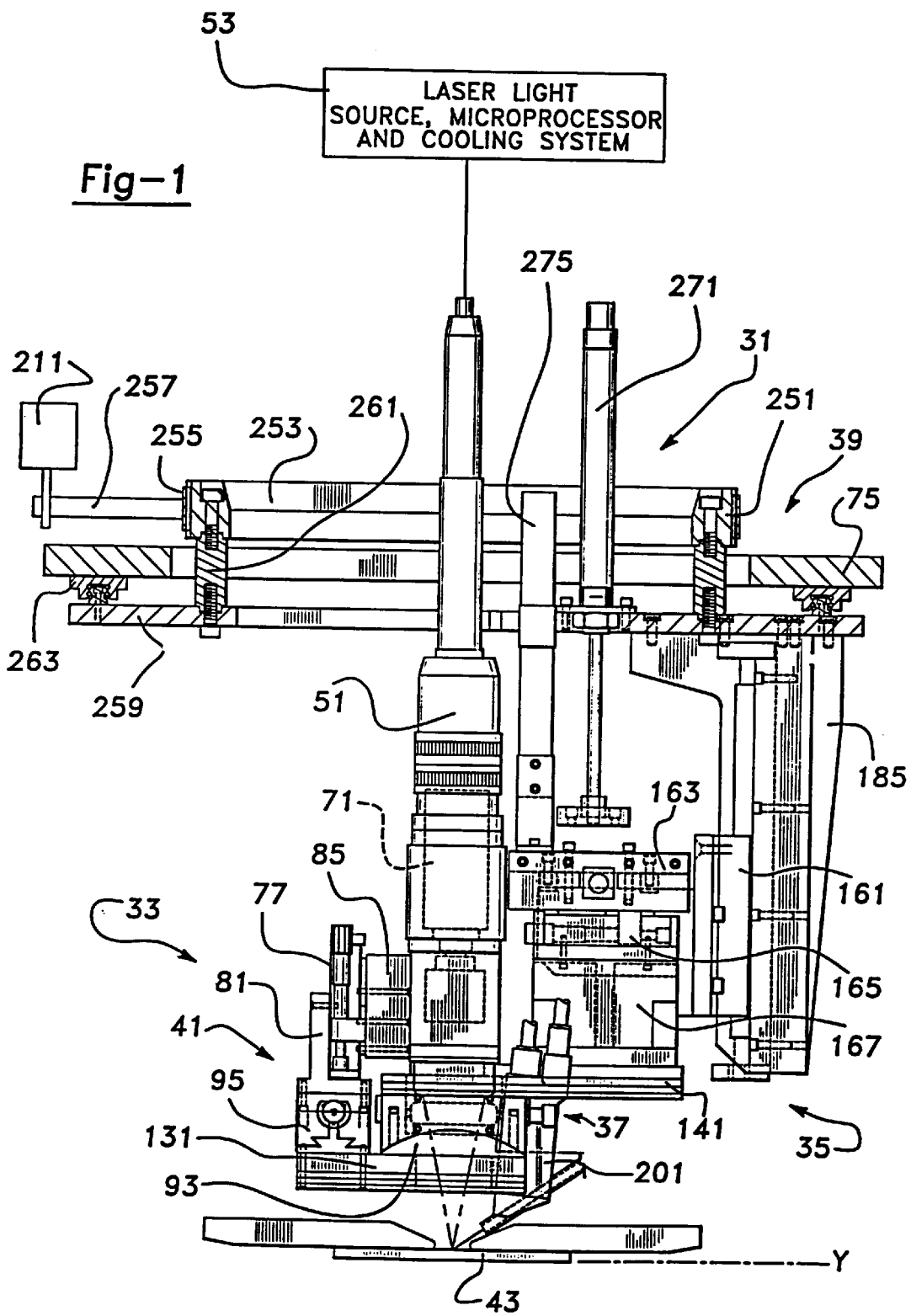
FIG. 1 is a side elevational view showing the preferred embodiment of a laser welding apparatus and control system of the present invention.
Figure 2:
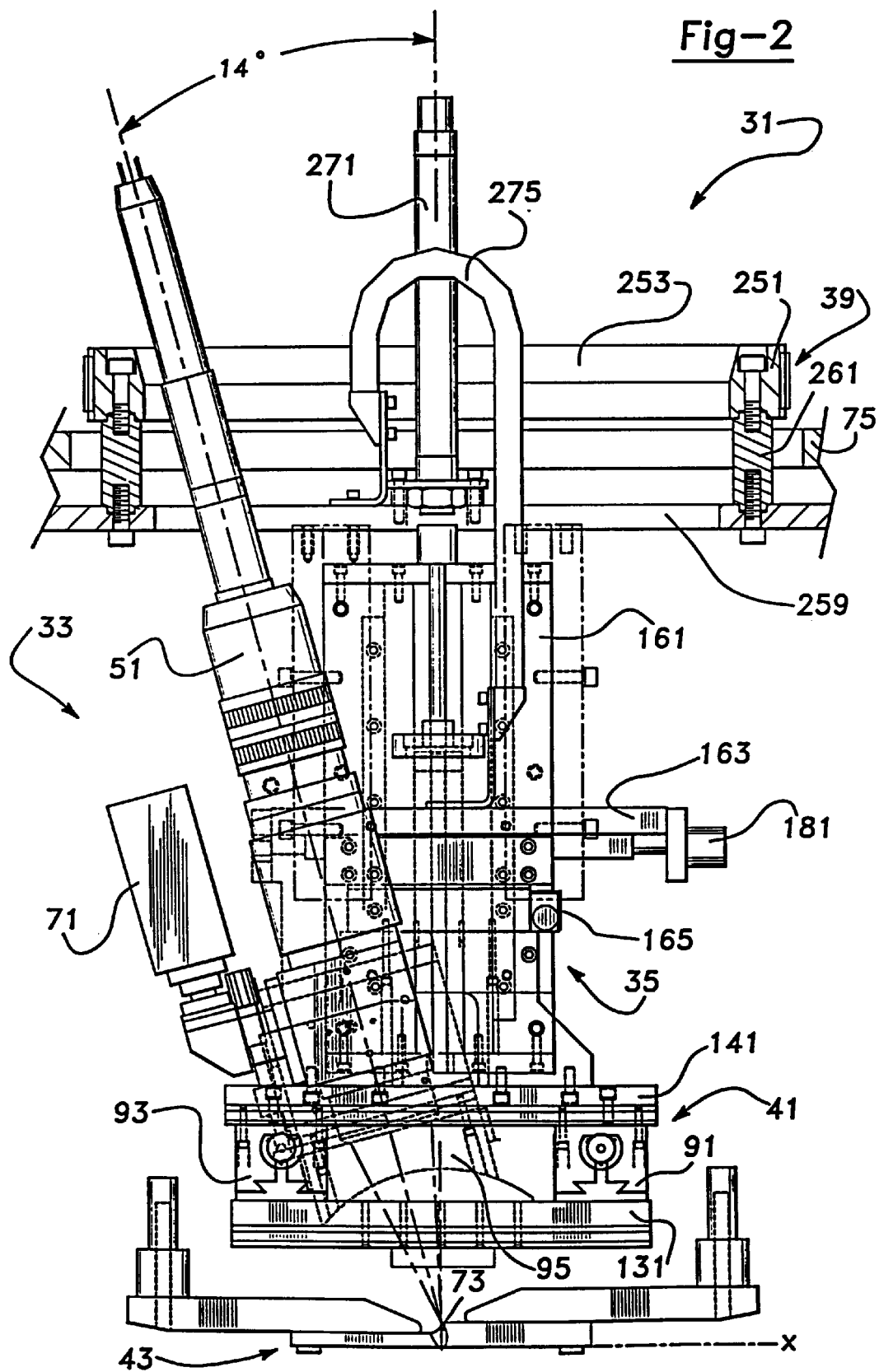
FIG. 2 is a side elevational view, taken perpendicular to that of FIG. 1, showing the preferred embodiment of the present invention laser welding apparatus and control system.
Figure 3:
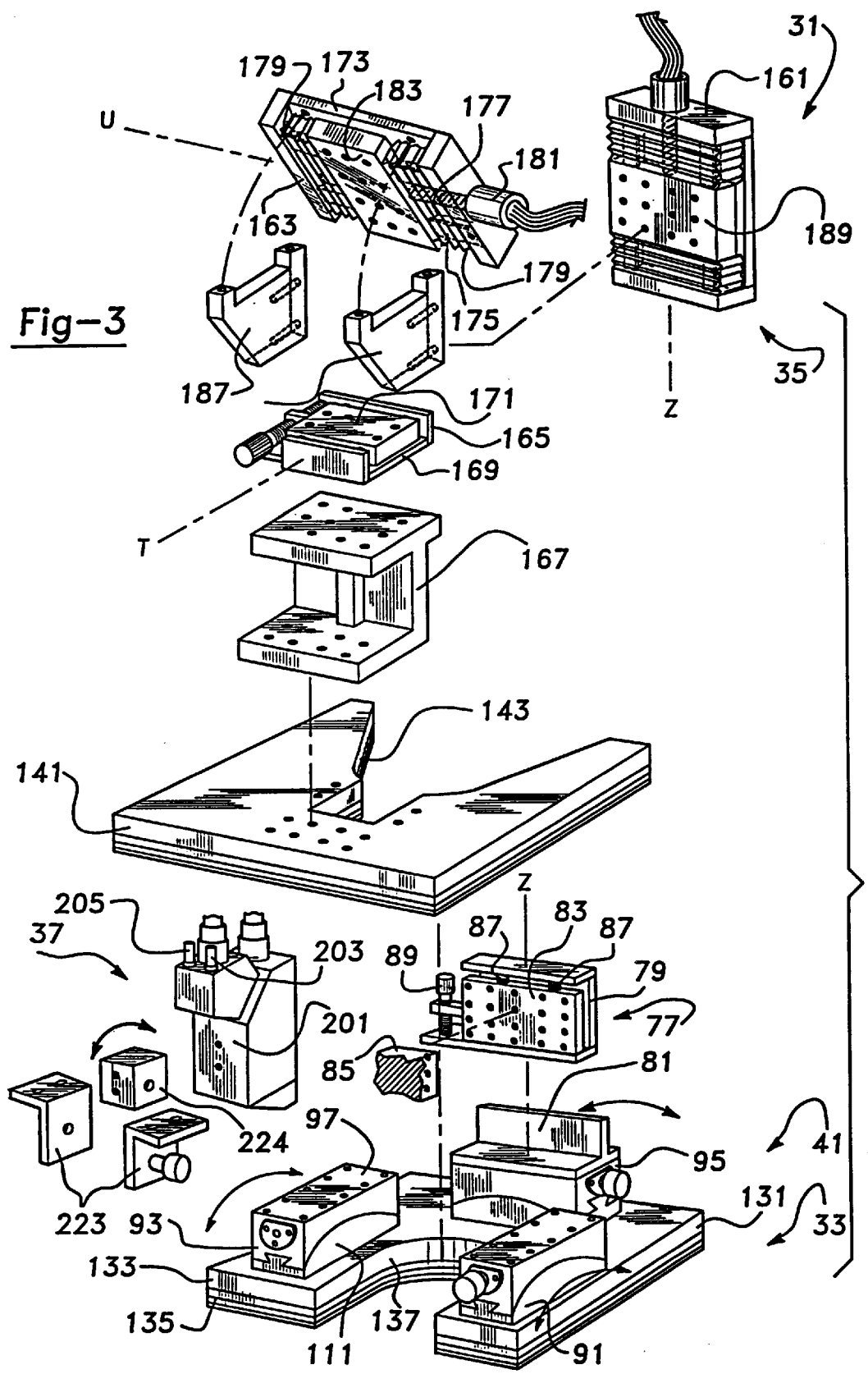
FIG. 3 is an exploded perspective view showing the preferred embodiment of the laser welding apparatus and control system of the present invention.

Referring to FIGS. 1 through 3, the preferred embodiment of a laser welding and cutting machine 31 employs a laser head assembly 33, slide set 35, seam tracking system 37 and gantry 39. A tilting mechanism 41 is employed to tilt laser head assembly 33 relative to slide set 35, gantry 39 and sheets of material 43. Sheets of material 43 are held to a work table by clamps and/or magnets. Although machine 31 can be used to cut apertures and edges in sheets of material 43, its use as a welding machine will be discussed in depth hereinafter.

Figure 13:
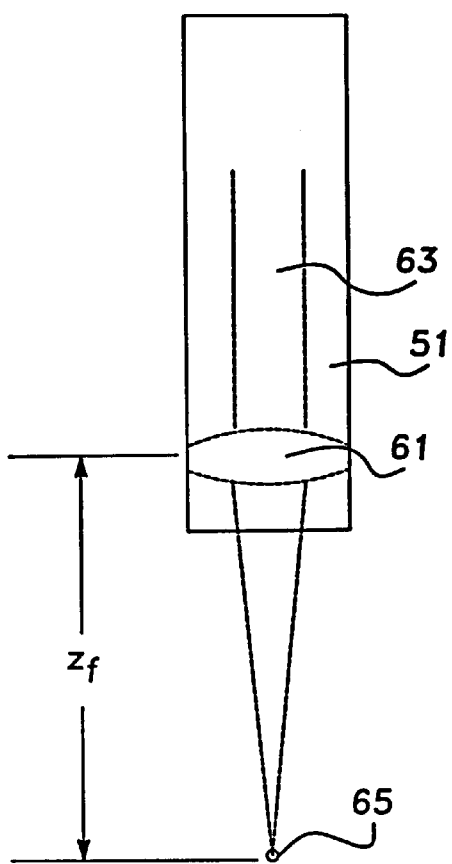
FIG. 13 is a diagrammatic side elevational view showing a laser beam focal point and focal length for the preferred embodiment laser welding apparatus and control system of the present invention.
Figure 14:
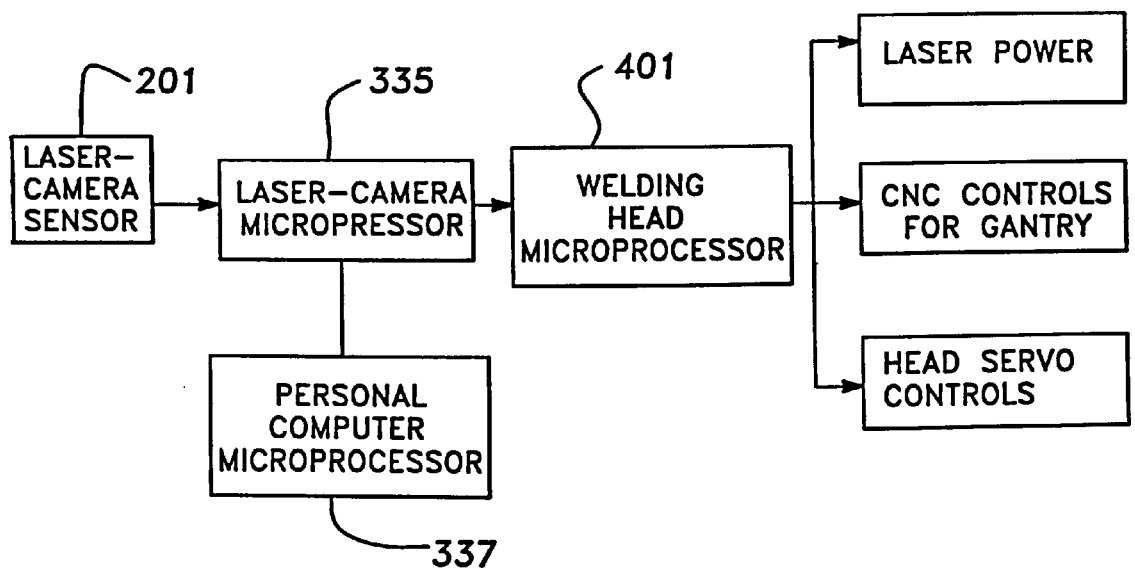
FIG. 14 is a schematic block diagram showing the interaction between electrical components employed within the preferred embodiment laser welding apparatus and control system of the present invention.

Laser welding head assembly 33 serves as a welding head and includes an Nd:Yag laser optic head 51 operably coupled to a laser microprocessor, laser light source (by way of a fiber optic cable) and laser cooling system 53. Laser optic head 51 can be obtained from Haas Corporation of Germany with a power capability of 6 kilowatts, however, a laser with 2–6 kilowatts will also be suitable. Another Nd:Yag laser which would perform in an adequate manner is of the type disclosed in U.S. Pat. No. 5,434,880 entitled "Laser System" which issued to Burrows et al. on Jul. 18, 1995, and is incorporated by reference herewithin. As illustrated in FIG. 13, laser optic head 51 has a lens 61 which collates the nominally parallel laser beams 63 and preferably projects them toward a single focal point 65 corresponding to the upper surface of the desired weld seam. A specific collating lens 61 is preselected and installed depending upon the desired laser beam focal length $Z_f$, as measured between lens 61 and focal point 65. A focal length of 200 millimeters (7.87 inches) has been found satisfactory for performing tailored blank welding as will be discussed in greater detail hereinafter.

Returning to FIGS. 1–3, laser head assembly 33 further includes a high resolution CCD camera 71 affixed to the side of laser optic head 51. CCD camera 71 aids in initial visual alignment of focal point 65 (see FIG. 13) with the abutting adjacent edges of sheets of material 43, referred to as the welding seam 73 (although the term seam also refers to the cut edge when the present invention is employed to cut rather th an weld material). The machine operator either looks through the CCD camera or observes an output LCD or CRT screen for aligning the laser beam focal point with the internally projected CCD camera cross hairs, by using a HeNe laser projected through a lens or by pulsing the Yag laser and measuring spot size. When the focal point is in registry with the X and Y axis cross hairs, laser head 33 and a bridge 75 of gantry 39 have been placed in their correct initialized position relative to the sheets of material 43. One such CCD camera can be purchased from Pulnix, series TM-7/TM-6.

A manually activated Z axis slide 77 has a fixed section 79 bolted onto a bracket 81. A moving section 83 of Z axis slide 77 is oppositely bolted onto a laser optic head adaptor bracket 85 which holds laser optic head 51. A manually rotated micrometer 89 is used in order to slide moving section 83 relative to fixed section 79. This provides for minute manual fine positioning of laser optic head 51 and the focal point relative to sheets of material 43 during initial set up. Spring guides 87 assist in keeping moving section 83 snug against the micrometer 89.

Figure 5:
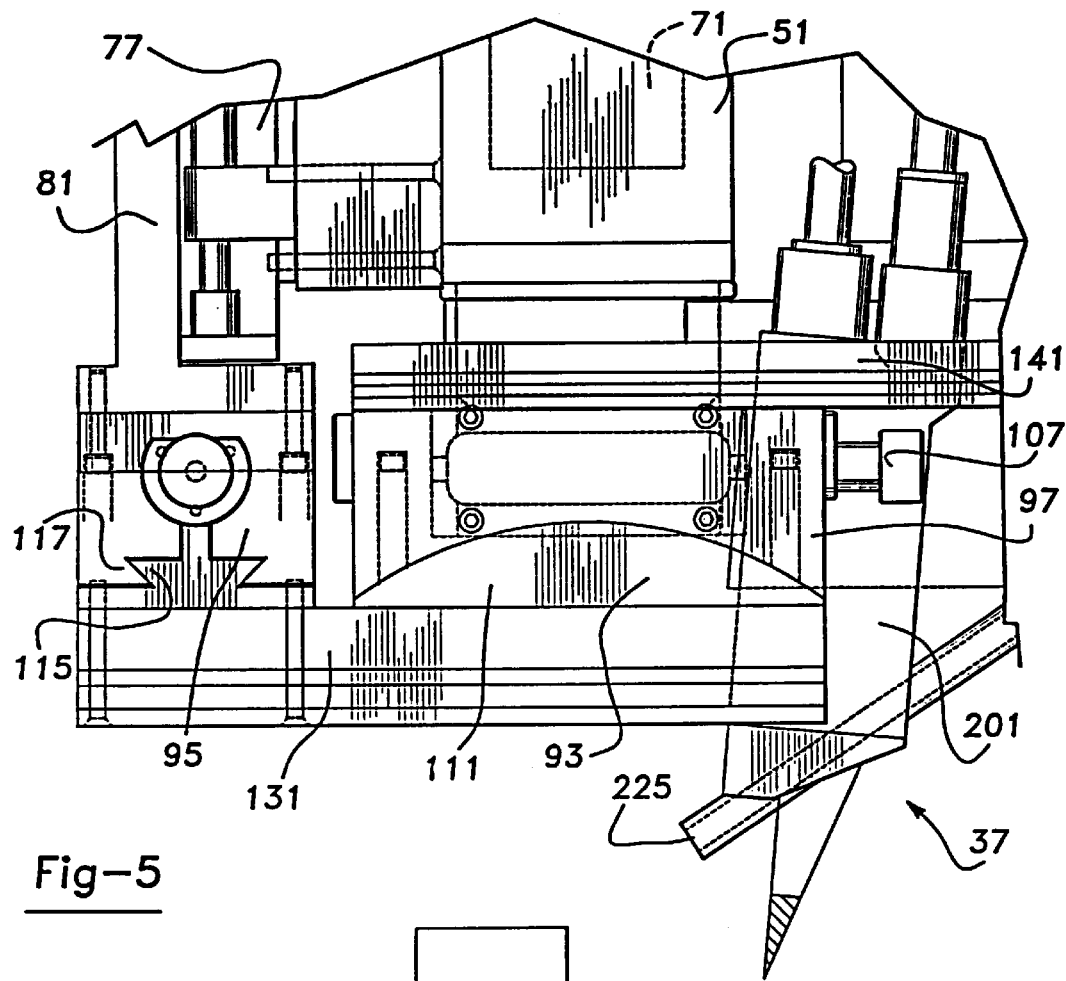
FIG. 5 is an enlarged side elevational view, similar to FIG. 1, showing the preferred embodiment laser welding apparatus and control system of the present invention having a laser optic oriented perpendicular to the sheet material.
Figure 4:
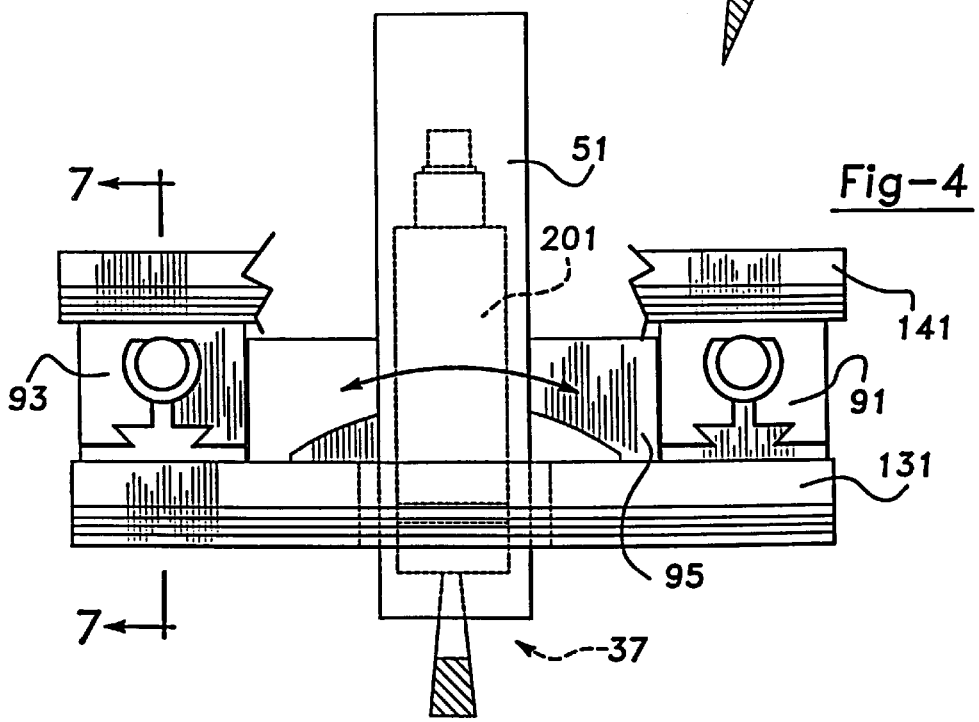
FIG. 4 is a diagrammatic side elevational view, similar to FIG. 2, showing the preferred embodiment laser welding apparatus and control system of the present invention.
Figure 6:
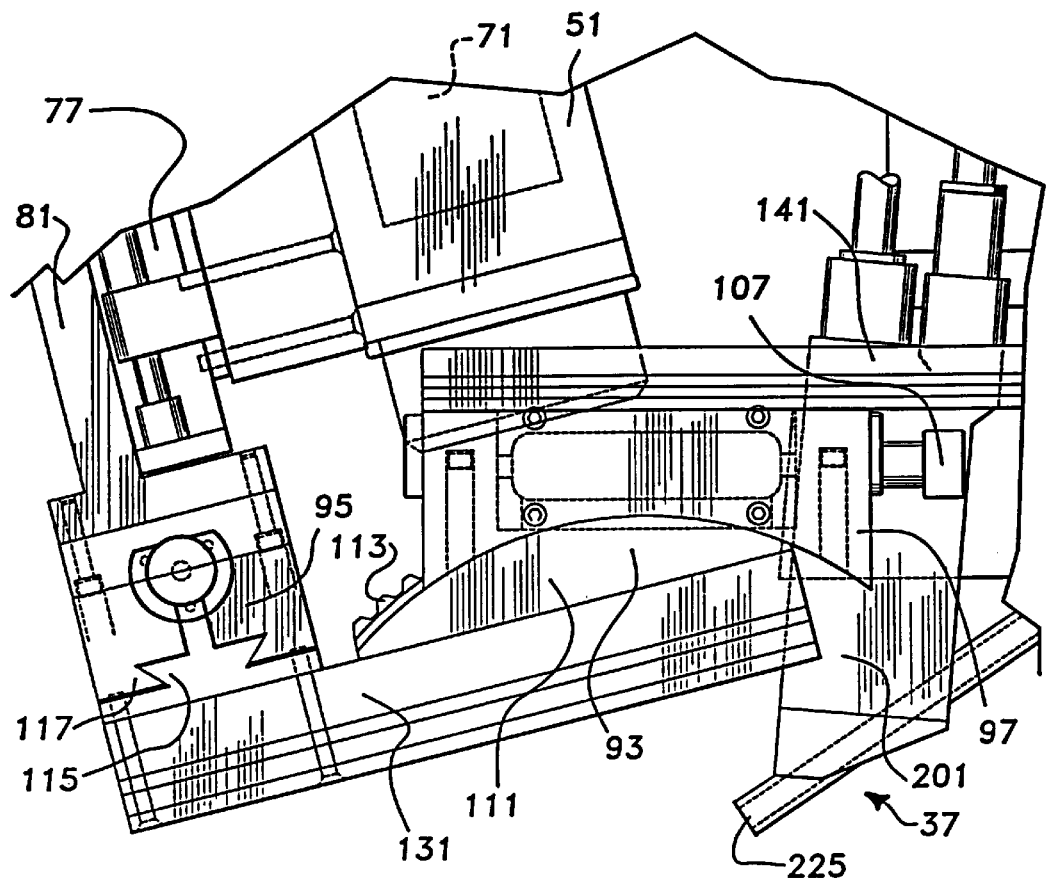
FIG. 6 is an enlarged side elevational view, similar to FIG. 5, showing the preferred embodiment laser welding apparatus and control system of the present invention having the laser optic tilted in relation to the sheet material.
Figure 7:
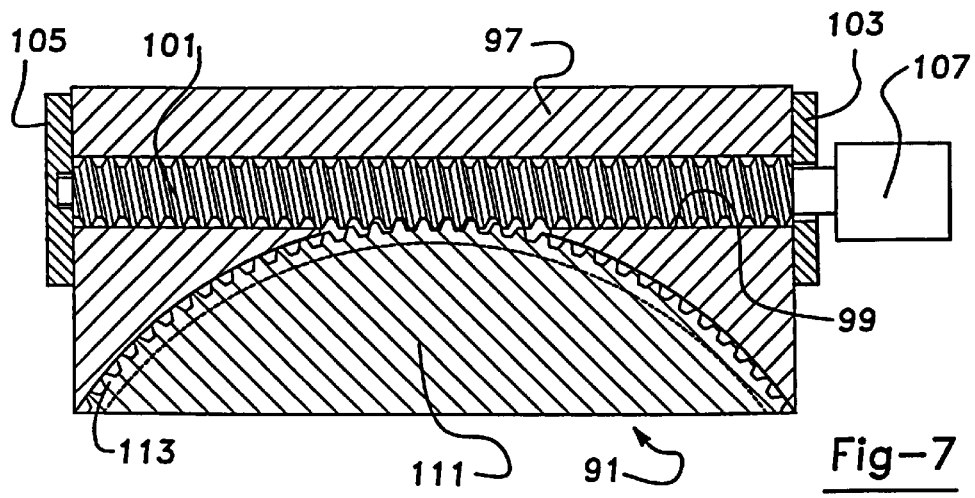
FIG. 7 is a sectional view, taken along line 7—7 of FIG. 4, showing a goniometer employed in the preferred embodiment laser welding apparatus and control system of the present invention disposed in an untilted position.
Figure 8:
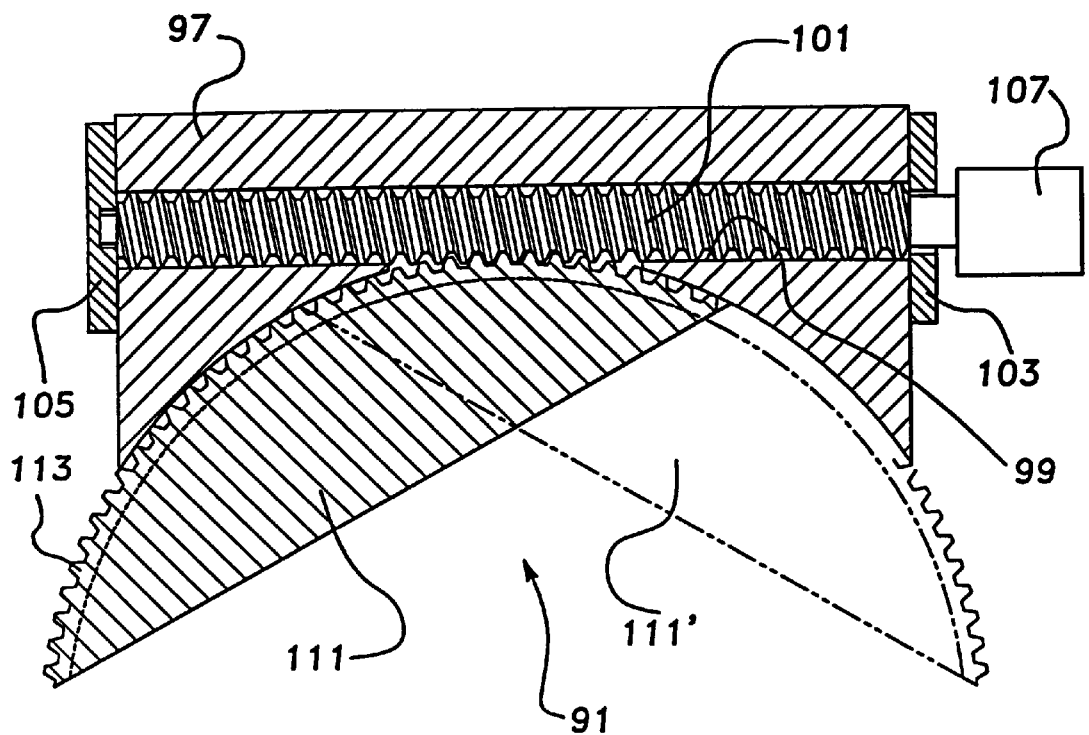
FIG. 8 is a sectional view, similar to that of FIG. 7, showing the goniometer employed in the preferred embodiment laser welding apparatus and control system of the present invention disposed in a tilted position.

Laser head assembly 33 further includes tilting mechanism 41. Tilting mechanism 41 consists of a first primary goniometer 91, a second slave goniometer 93 and a third primary goniometer 95. These motorized goniometers are also more generally defined as radial bearings. The primary goniometers 91 and 95 are illustrated in more detail in FIGS. 7 and 8. Exemplary goniometer 91 has a driving bearing block 97 with a longitudinal bore 99 extending throughout its length. A worm gear or drive screw 101 is disposed within bore 99 and held in position by journalling plates 103 and 105 screwed to driving bearing block 97. Additional bearing races may be employed. An armature shaft of an electric dc servomotor 107 is formed as part of or otherwise coupled to driving screw 101. In another preferred embodiment, it is also envisioned that a knob (not shown) is affixed to driving screw 101 in place of motor 107 for manual actuation when only partial automation is desired. Goniometer 91 further has a driven bearing block 111 from which internally extends a set of teeth 113 arranged in a semi-circular manner having a radius equal to the focal length $Z_f$. Teeth 113 are enmeshed with a portion of driving screw 101 such that when knob 107 is rotated, or an electric motor armature and armature shaft are rotated, driving screw 101 will simultaneously rotate for drivably rotating driven bearing block 111 in relation to driving bearing block 97. The rotated positions can be observed by comparing FIGS. 7 and 8. As shown in FIG. 5, driving bearing block 97 and driven bearing block 111 are further secured to each other by mating dovetailed interlocks 115 and 117. Teeth 113 (see FIG. 7) are centrally disposed along the center of interlock 115 in a longitudinal manner. Slave goniometer 93 is essentially the same as primary goniometer 91 except that the drive transmission, consisting of drive screw 101 and motor 107, is omitted. Suitable manual knob actuated goniometers can be purchased from Chuo Seiki.

As is illustrated in FIGS. 1 through 3 and 7, driven bearing block 111 of each goniometer is bolted onto a lower plate 131 and oriented such that the longitudinal axis of first primary goniometer 91 is parallel to the longitudinal axis of slave goniometer 93 while third primary goniometer 95 is located perpendicular to goniometers 91 and 93. Lower plate 131 is constructed from an aluminum sheet 133 adhered to a laminated sandwich 135 consisting of a pair of outer aluminum skins with either a balsa wood or aluminum honeycomb spacer therebetween. This laminated sandwich adds significant structural stiffness to lower plate 131. Lower plate 131 has a U-like shape with an open cavity 137 for allowing free travel of the tilted laser optic head 51.

Bracket 81 is bolted upon driving bearing block 97 of third primary goniometer 95 such that manually actuated Z axis slide 77 operably tilts side-to-side. An upper plate 141, constructed the same as lower plate 131, is bolted upon driving bearing blocks 97 of first primary goniometer 91 and second slave goniometer 93. Hence, lower plate 131 tilts and rotates in concert with goniometers 91 and 93. Upper plate 141 has a central key-holed orifice 143 for receiving laser optic head 51.

Referring now to FIGS. 1 through 3, slide set 35 includes an automated Z axis slide 161, an automated U axis slide 163, a manually actuated T axis slide 165 and their associated mounting bracketry. A support bracket 167 is bolted onto an upper face of upper plate 141. Furthermore, a stationary segment 169 of T axis slide 165 is bolted onto an upper shelf of support bracket 167. A sliding segment 171 of T axis slide 165 has a sliding segment 183 (see FIG. 3) of U axis slide 163 bolted thereto. T axis slide 165 is constructed substantially the same as manually actuated Z axis slide 77.

U axis slide 163 has two rows of preloaded ball bearing races 175, a central ball screw assembly 177, four runner blocks (not shown), driving bearing end plates, floating bearing end plates and bellows 179. Furthermore, an approximately 20 watt, dc servomotor 181 has an internal armature and armature shaft which rotatably drive ball screw assembly 177. U axis slide 163 also has adjustable limit switches for determining the hardware travel limits of sliding segment 183 positioning relative to stationary segment 173. Stationary and sliding segments, respectively 173 and 183, are both machined from cast aluminum. Automated Z axis slide 161 is constructed similar to automated U axis slide 163 except that Z axis slide 161 has added structural stiffness and supporting ribs 185 as well as a longer linear travel. The electric servomotor employed with automatic Z axis slide 161 preferably has a power rating of approximately 60 watts. Two brackets 187 are bolted upon a sliding segment 189 of automated Z axis slide 161 and upon stationary segment 173 of automated U axis slide 163. All of the brackets disclosed herein are preferably made from machined aluminum but may be provided with many differing shapes and configurations from those specifically shown.

As can best be observed in FIGS. 3 through 5, 14 and 20, seam tracking system 37 is preferably a Servo-Robot three-dimensional laser-camera 201, type BIP-20. This Servo-Robot laser-camera 201 employs active optical triangulation principles using structured laser beam illumination and a photo sensitive illumination detection sensor. Laser-camera 201 further has a built-in 30 mW visible laser diode (independent from the welding laser) and has a 20 millimeter depth of view, 18 millimeter close plane field of view, 32 millimeter far plane field of view, 0.06 millimeter average depth resolution, and a speed of 30 profiles per second for 478 lateral sampling points and 60 profiles per second for 239 lateral sampling points. Laser-camera 201 has an air inlet 203, a coolant outlet 205 and a coolant inlet (not shown). Laser-camera 201 utilizes the self-contained laser and sensor to optically track the welding seam in a non-contact and non-capacitive manner.

A high performance pDSP parallel vision, laser-camera microprocessor and process controller 335 are compatible with an IBMPC ISA bus and are electrically connected to the self-contained laser and camera sensor within laser-camera 201. Laser-camera microprocessor 335 employs a TMS320C40 parallel DSP which runs at 20 MIPS. The PILOT 3000 laser-camera microprocessor 335 coordinates the laser-camera 201 motion and three-dimensional data acquisition while also controlling the laser head servo controls, including automated slides 161 and 163, in addition to CNC gantry controls, including an electric C axis rotation motor 211, X axis gantry motor 501 and Y axis gantry motor 503, through a gantry microprocessor 505. The Servo-Robot laser-camera microprocessor 335 sends and receives information signals from and to an input/output/teaching pendant PC computer/microprocessor 337 running on a Windows® operating system.

FIGS. 3 and 5 show laser-camera 201 mounted to a bottom of upper plate 141 within a square portion of orifice 143 by way of a pair of outer, inverted L-shaped brackets 223 cradling a central mounting cube 224 by way of threaded shoulder bolts 226. Cube 224 is bolted onto laser-camera 201 and both are tiltable relative to outer brackets 223, through temporary loosening of bolts 226, to allow positional adjustment of laser-camera scanning relative to the welding beam focal point. A shield gas supply tube 225 is also affixed to upper plate 141 by suitable clamps (not shown). Argon shielding gas or the like is supplied to the welding seam through shield gas supply tube 225. Laser camera 201 and tube 225 thereby move in concert with upper plate 141 and are thus, not tilted.

Referring to FIGS. 1 and 2, gantry 39 includes a vertically rising pair of stationary structures or frames (not shown) upon which are movably mounted bridge 75. Bridge 75 is moved along a Y axis, also known as the weld direction, by energization of one or more servomotors 503 (see FIG. 20B) which are mounted to bridge 75 or the structures and controlled by the gantry microprocessor 505. A rotatable carousel 251 has an upper ring 253 with a set of outwardly extending teeth 255 driven by a chain 257, belt or gear enmeshed with ring electric servomotor 211. Carousel 251 further has a lower ring 259 bolted to upper ring 253 by a series of standoffs 261. A 600 millimeter diameter rotary bearing 263 slidably couples lower ring 259 to the underside of bridge 75. Hence, laser head 33 can be rotated relative to bridge 75 and sheet material 43 about C rotational axis. Automated Z axis slide 161 is bolted to an underside of lower ring 259. Gantry 39 may be of the type generally disclosed in U.S. Pat. Nos. 5,229,571 entitled "High Production Laser Welding Assembly and Method" which issued to Neiheisel on Jul. 20, 1993, and 4,436,288 entitled "Metal Machining Device with Control Circuit Isolation" which issued to Kellogg et al. on Mar. 13, 1984, both of which are incorporated by reference herewithin. Additionally, a pneumatically actuated cylinder 271, energized by a solenoid 507 (see FIG. 20B), a counterbalance assisting and counterbalancing Z axis movement of laser head 33. Cylinder 271 has an intermediate portion bolted upon an upper surface of lower ring 259 and has a bottom member bolted to laser head 33 by way of Z axis slide 161. A flexible electrical cable track 275 also has an end mounted to lower ring 259.

Reference should now be made to FIGS. 1 through 6 for an understanding of the function and operation of the present invention laser welding machine. As previously stated, teeth 113 of each driven bearing block 111 form a theoretically semi-circular shape having a radius equal to the focal length $Z_f$. Therefore, tilting movement of goniometers 91 and 93 serve to tilt laser optic head 51 about its focal point 65 rather than about a traditional fixed mechanical pivot offset from the focal point. This provides superior accuracy in the focus of the laser beam despite various tilted orientations of laser optic head 51 in relation to the weld seam and sheet material. Further, no steerable or movable mirrors are used to redirect the laser beam.

Structurally, driving bearing blocks 97 of goniometers 91 and 93 are fixed to upper plate 141 such that rotation of motor 107 or alternately, knob, causes the corresponding driven bearing blocks 111 to rotate and tilt lower plate 131. This can best be observed by comparing FIGS. 5 and 6. The entire goniometer 95 tilts with driven bearing blocks 111 of goniometers 91 and 93 whereby bracket 81, manually activated Z axis slide 77 and laser optic head 51 tilt in concert therewith about a first tilting plane.

Third primary goniometer 95 can also be actuated to tilt laser optic head 51 in a second plane, perpendicular to that tilted by goniometers 91 and 93. Regardless of the disposition of goniometers 91 and 93, goniometer 95 can be actuated to rotate and tilt driving bearing block 97 relative to the driven bearing block 111 which is fixed to lower plate 131. This causes bracket 81, annually activated Z axis slide 77 and laser optic head 51 to tilt as shown by the arrow in FIG. 4. The goniometers preferably allow 14 degrees of laser tilting on either side of the vertical axis (see FIG. 2).

Referring to FIGS. 1 through 3 and 14, automated Z and U axis slides 161 and 163, respectively, as well as C axis carousel 251, are selectively moved by energization of their corresponding servomotors in order to have laser optic head 51 follow the welding seam when it is curved or the sheet material is bowed in the Z axis direction. The U and Z axis slide servomotors are controlled by a real-time, closed-loop feedback circuit through the weld head processor. The C axis movement is controlled by the gantry controls wherein a position feedback (encoder) signal is relayed to laser-camera processor 335 to allow the U axis movement to be corrected for the gantry programmed curve.

As shown in FIGS. 9 through 12, the present invention is optimal for producing tailored blank butt welds. Tailored blank welds are those in which adjacent sheets of material 43 comprise similar or dissimilar metal types and/or thicknesses. For example, in automotive vehicle body side frames, it is desired to produce a butt weld between cold rolled steels 301 or on either lateral side of pieces of galvanized steel 303. Galvanized steel 303 can be of a greater thickness than does cold rolled steel 301 thereby providing a somewhat difficult to access seam especially when they are placed in the orientation shown in FIG. 10.

Laser optic head 51 is preferably tilted toward the open side of seam 73 when dissimilar sheets of material 43 are oriented as shown in FIG. 10, given a normal gap width. This provides significantly improved access to seam 73 while also reflecting laser beam away from the laser optic, thereby reducing harmful reflections from reaching the delicate optic lens. Alternately, laser optic head 51 is nominally oriented perpendicular to the upper coplanar surface of sheets of material 43 when oriented as shown in FIG. 11.

Referring to FIGS. 1 through 3, 12, 14, 15A, 15B, 20 and 21, the present invention enhances tailored blank welding and similar material butt welding across large seam gaps which could not have been previously welded using conventional systems. The present invention laser welding machine accomplishes this large gap (greater than 10% of the material thickness) welding as follows. First, laser optic head 51 and laser-camera 201 are placed in their initialized position by use of the CCD camera 71, manually activated Z axis slide 77 and automated U axis slide 163. Second, laser-camera 201 and welding laser optic head 51 are energized such that laser-camera 201 projects and receives a triangulated and reflected laser beam along seam 73. These first two steps are the procedures for initial set up of the axes and laser-camera reference. Laser-camera 201 projects its laser beam approximately 30 millimeters ahead of focal point 65 (see FIG. 13) from welding laser optic head 51 due to the laser-camera microprocessor 335 speed. However, it would be more desirable to orient the projected laser-camera beam focal point as close as possible to the welding laser beam focal point in order to achieve totally accurate actual condition sensing simultaneous with the welding. Third, laser-camera 201 and the Servo-Robot laser-camera microprocessor 335 controlled slides and servomotors track welding seam 73 as bridge 75 moves laser head 33 along the welding direction. This allows laser head 33 to accurately weld along a straight or curved seam 73. Fourth, concurrently with the seam tracking function, laser-camera 201 senses the gap width Y between adjacent edges 331 and 333 of sheets of material 43. Fifth, this sensed gap width Y is then output to a welding head microprocessor 401 for a comparison to a predetermined gap value X. Welding head microprocessor 401 stores the sensed gap value Y in RAM for a comparison to value X previously stored in ROM. Typically, gap value X is 10 percent of the lesser sheet material thickness. Sixth, welding head microprocessor 401 then determines if the sensed gap value Y is greater than a maximum non-weld value (for example, 25% of the lesser sheet material thickness). Seventh, if such a maximum non-weld value is observed, then welding laser and laser-camera 201 are de-energized for manual realignment or scrappage of the sheets of material 43.

Eighth, if sensed gap value Y is greater than predetermined value X but less than the maximum non-weld value, laser-camera microprocessor 335 and welding head microprocessor 401 will cause one or more combinations of the following events to occur: (a) servomotors 107 attached to each primary goniometer will be energized to automatically tilt the goniometers to predetermined rotational setting S depending upon the sensed value Y by reference to a ROM comparison table previously programmed into welding head microprocessor 401; (b) Laser microprocessor by way of a welding head microprocessor output signal, will increase the welding laser power a predetermined amount, through a laser microprocessor 509, depending upon value Y based on a preprogrammed welding head microprocessor 401 ROM chart; (c) Gantry processor by way of the welding head microprocessor 401 will slow down bridge 75 movement speed a predetermined amount, through gantry microprocessor 505, depending upon sensed value Y based upon another ROM welding head microprocessor 401 table array or chart; (d) Welding head microprocessor 401 will energize then de-energize automated Z axis slide 161 to change the laser $Z_f$ height relative to the sheet material an amount based upon another ROM table preprogrammed into welding head microprocessor 401 in light of the sensed value Y; this last step would be less desirable due to the mismatched focal length.

The purpose in tilting, or further tilting, laser optic head 51 relative to the sheets of material 43 is that the effective material thickness (as measured along the angle of the welding laser centerline) is increased such that the weld gap Y would, in essence, be less than 10 percent of the angled material thickness. This would provide sufficient weld material flow for providing a strong butt weld. This laser tilting function is especially advantageous for a tailored blank weld wherein laser optic head 51 can be angled across the thicker sheet of material, thus, providing even greater weld material flow across a smaller effective percentage gap as compared to the angled material thickness.

Moreover, the increased welding laser power and slowed bridge movement and raised welding laser height functions all provide increased welding material melting and flow to bridge the welding seam gap.

Figure 15A:
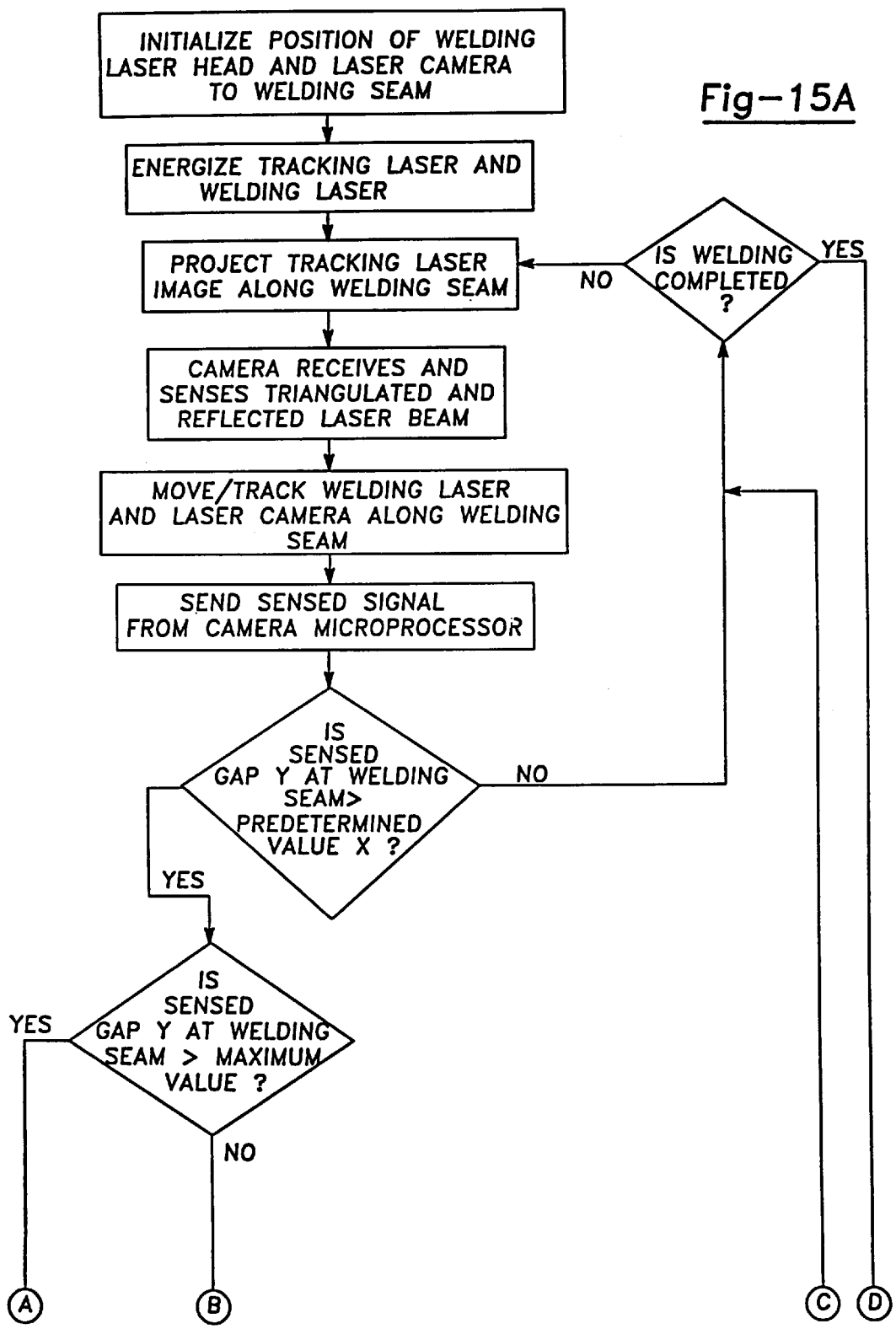
FIGS. 15A and B are a processing flow chart for the preferred embodiment laser welding apparatus and control system of the present invention.
Figure 16A:
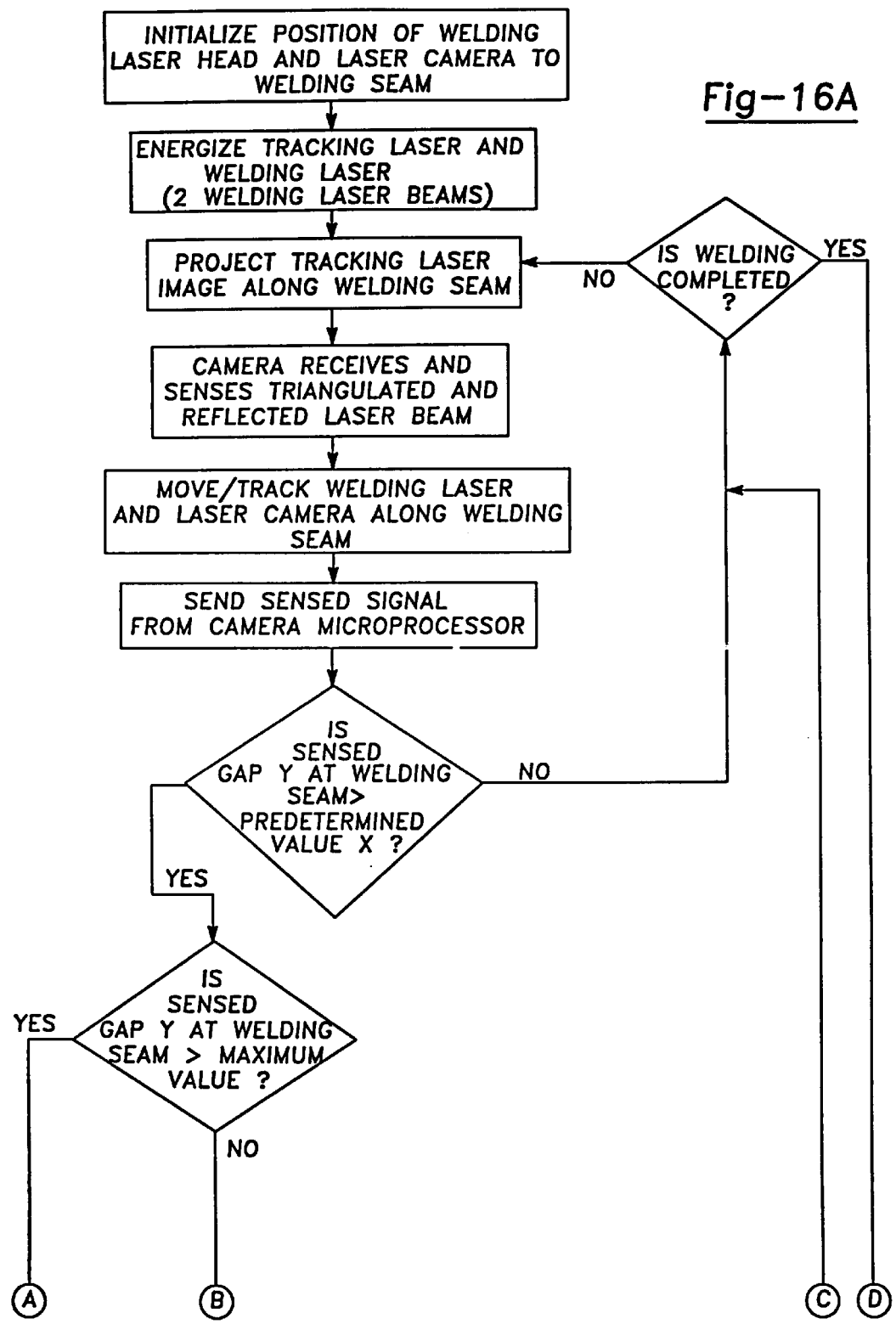
FIGS. 16A and B are a processing flow diagram for the preferred embodiment laser welding apparatus and control system of the present invention.
Figure 16B:
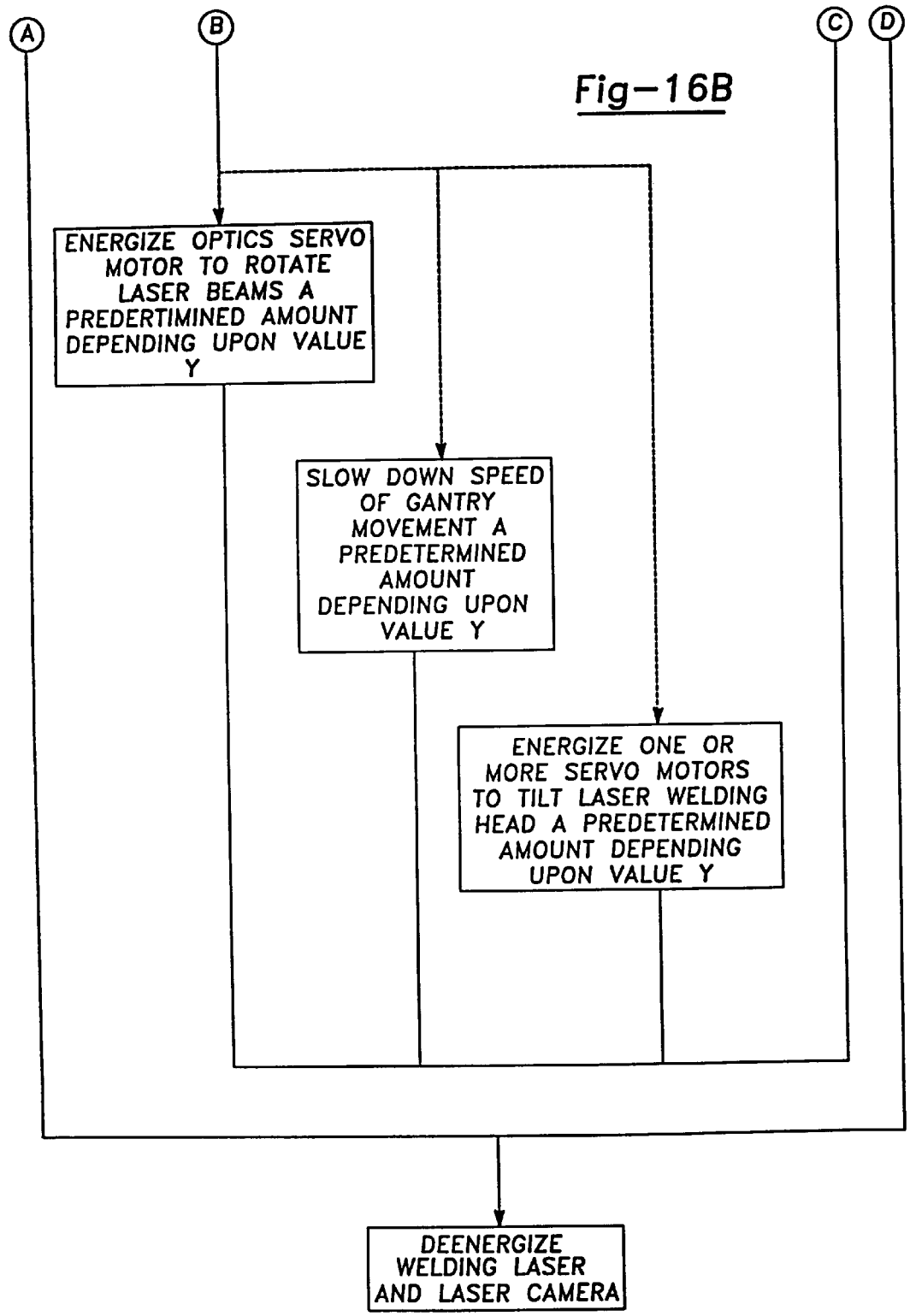

The operational steps shown in FIGS. 16A and B are generally the same as those previously discussed and shown for steps 1 through 6 in FIGS. 15A and B, with the following subsequent differences. If a maximum-weld value is observed, then at least one of the following actions will occur: (a) welding head microprocessor 401 will cause energization of a laser beam servomotor 601 (see FIG. 19) for rotating or otherwise causing movement of split laser beams as will be described in greater detail hereinafter; laser beam servomotor 601 is energized a predetermined amount depending upon an energization time value correlating to sensed value Y as preprogrammed into ROM within welding head microprocessor 401; (b) the Y axis bridge movement speed will be slowed down a predetermined amount corresponding to sensed value Y preprogrammed into ROM within either welding head microprocessor 401 or gantry microprocessor 505; and/or (c) one or both servomotors 107 driving the goniometers will serve to tilt laser welding head 33 a predetermined amount depending upon a welding head microprocessor preprogrammed ROM motor energization time value corresponding to sensed value Y.

Figure 17:
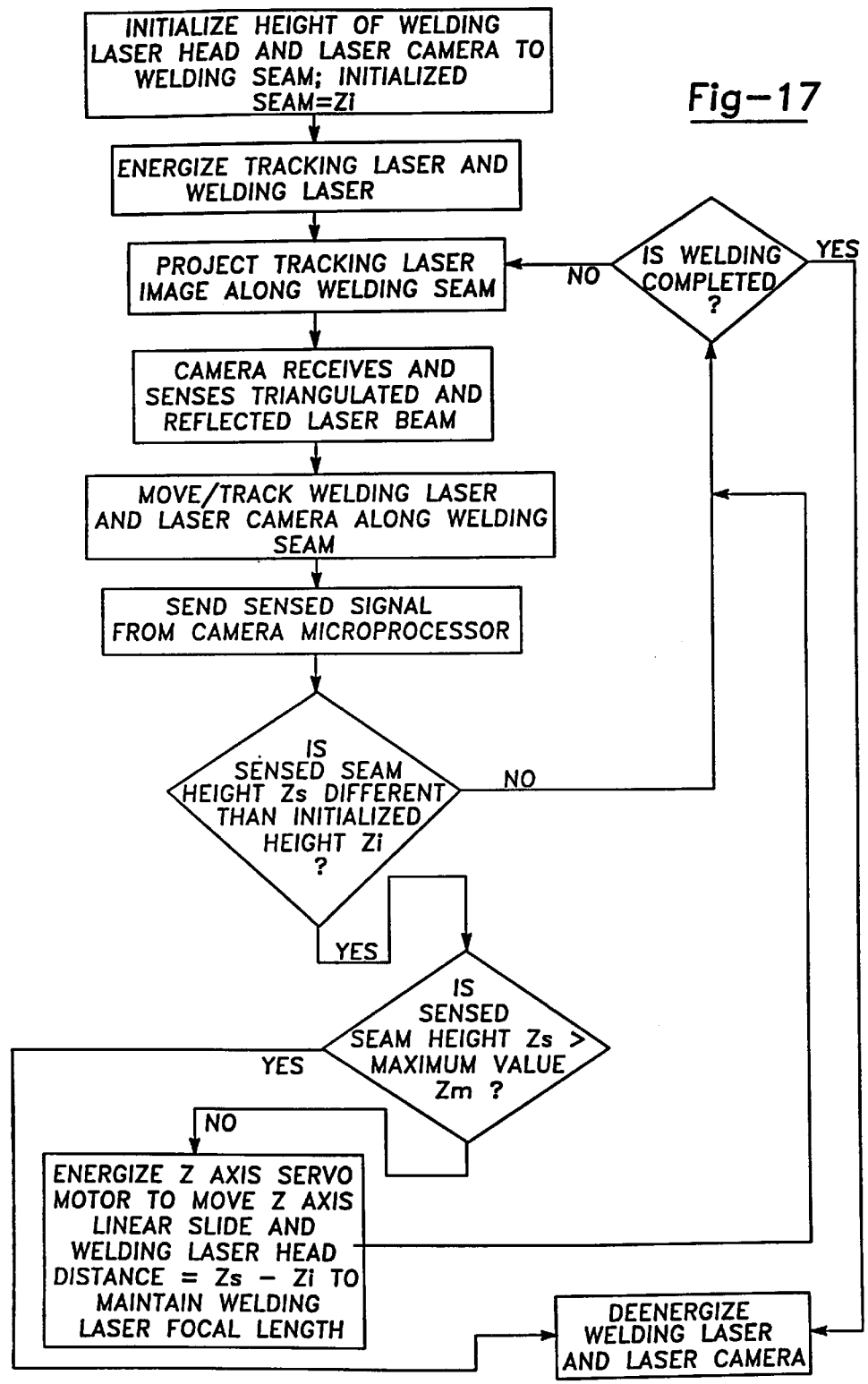
FIG. 17 is a processing flow diagram for the preferred embodiment laser welding apparatus and control system of the present invention.

FIG. 17 illustrates the initialized vertical axis height, $Z_i$ which employs the sheet material and seam as the Z axis datum rather than the traditional use of the bridge as the datum. Accordingly, the initialized seam vertical height is initially established during welding laser head and laser-camera set up, thus defining $Z_i$. Otherwise, the first through third steps of FIGS. 15A and B are generally the same for the process shown in FIG. 17. Subsequently, laser-camera microprocessor 335 (see FIG. 20) determines if a later sensed seam height $Z_s$ is different than the datum $Z_i$. This comparison is continuously and repetitively carried out throughout the entire welding path. If $Z_s$ equals $Z_i$ then no height adjustment is made and the sampling loop is continued as long as further welding is necessary. If $Z_s$ is higher or lower than $Z_i$ then the laser-camera microprocessor determines if $Z_s$ is greater than maximum value height $Z_m$, which would indicate undesirable excessive part warpage or bending. In this excessive situation, the welding laser and laser-camera are de-energized so the sheets of material can be scrapped (even if they could be properly welded). Finally, if $Z_s$ is less than $Z_m$, laser-camera microprocessor 335 will send a predetermined signal to welding head microprocessor 401 (see FIG. 21) which will concurrently cause energization of a Z axis motor 603 (also see FIG. 21) an amount equal to the difference between $Z_s$ and $Z_i$ in order to maintain the welding laser focal length and focal point upon the seam.

Figure 18:
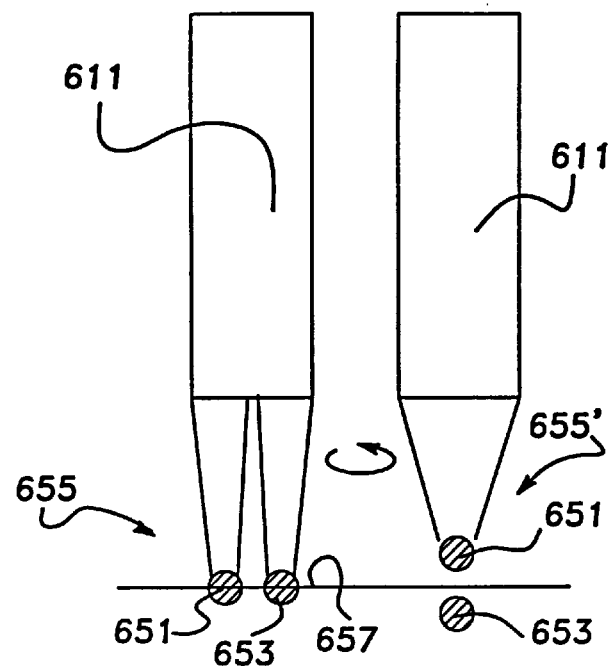
FIG. 18 is a diagrammatic top elevational view showing a series of orientations of an alternate embodiment of the laser welding apparatus and control system of the present invention.
Figure 19:
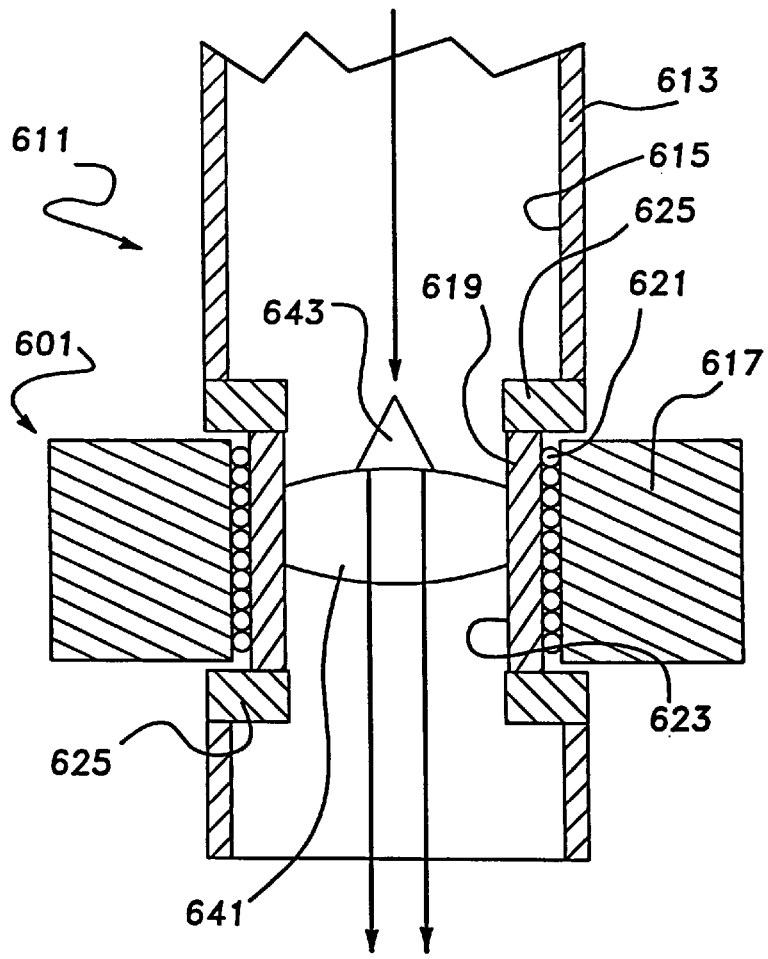
FIG. 19 is a diagrammatic sectional view showing the alternate embodiment laser welding apparatus and control system of the present invention of FIG. 18.

FIGS. 18 and 19 illustrate an alternate embodiment laser optic head 611 employed within the present invention. Laser optic head 611 has a cylindrical housing 613 with a coaxially aligned internal passageway 615. Electric motor 601 is mounted to housing 613. Motor 601 has a fixed permanent magnet stator 617 and an internally disposed annular armature 619 surrounded by conductive copper wire windings 621. Armature 619 has an internal bore 623 coaxially aligned and accessible to internal passageway 615 of housing 613. Armature 619 is journalled within housing 613 by way of a pair of bearing races 625. A casing (not shown) may surround motor 601.

Optic members are disposed within bore 623 of armature 619. The optic members include a lens 641 and a prism 643. Lens 641 has a circular periphery affixed to armature 619. Prism 643 is located above lens 641 and retained either to lens 641 or armature 619 by various suspension brackets or the like. Electric motor 601 is preferably of a brushless type directly driving the optic members without additional gearing or belts. Optical members purchased from Trumf of Germany may also be employed for splitting the laser beams. Alternately, other beamsplitting devices may be used such as that disclosed within U.S. Pat. No. 5,478,983 entitled "Process and Apparatus for Welding or Heat Treating by Laser" which issued to Rancourt on Dec. 26, 1995, and U.S. Pat. No. 4,691,093 entitled "Twin Spot Laser Welding" which issued to Banas et al. on Sep. 1, 1987, both of which are incorporated by reference herewithin.

The objective of this laser embodiment is to automatically move a pair of split laser beams, having focal points 651 and 653 from a first orientation 655, with focal points 651 and 653 defining a line generally coaxial and parallel to a welding seam 657, to a second orientation 655', wherein focal points 651 and 653 define a line generally transverse to welding seam 657. In second orientation 655', focal point 651 is disposed on one side of welding seam 657 while the other focal point 653 is disposed on the opposite side of welding seam 657 (as viewed from above seam 657). This laser beam and focal point rotation are automatically achieved by welding head microprocessor 401 causing energization of motor 601 in either a counterclockwise or clockwise direction which rotates the beamsplitting optics. This rotation automatically occurs during Y axis welding movement without the need to turn off the machine or otherwise stop movement. Such focal point movement is ideal for welding across large seam gaps since the second orientation 655' allows the welding laser beams to melt material from areas further away from the seam centerline to cause a larger molten pool and, thus, adequately weld across the larger seam. The focal points and laser beams are automatically returned to their nominal first orientation 655 when normal gap (less than 10 percent of the lesser sheet material thickness) welding conditions are sensed by the laser-camera. However, it should be appreciated that other beamsplitting optics and focal point movement actuators may be employed as long as automatic coaxial to transverse split beam positioning can be readily achieved. For example, multiple immediately adjacent laser heads, rather than the single split beam laser head disclosed, can be rotated or selectively energized and deenergized. Furthermore, a solenoid can be alternately energized to slide, rather than rotate, optic members within a beamsplitting laser.

Figure 20A:
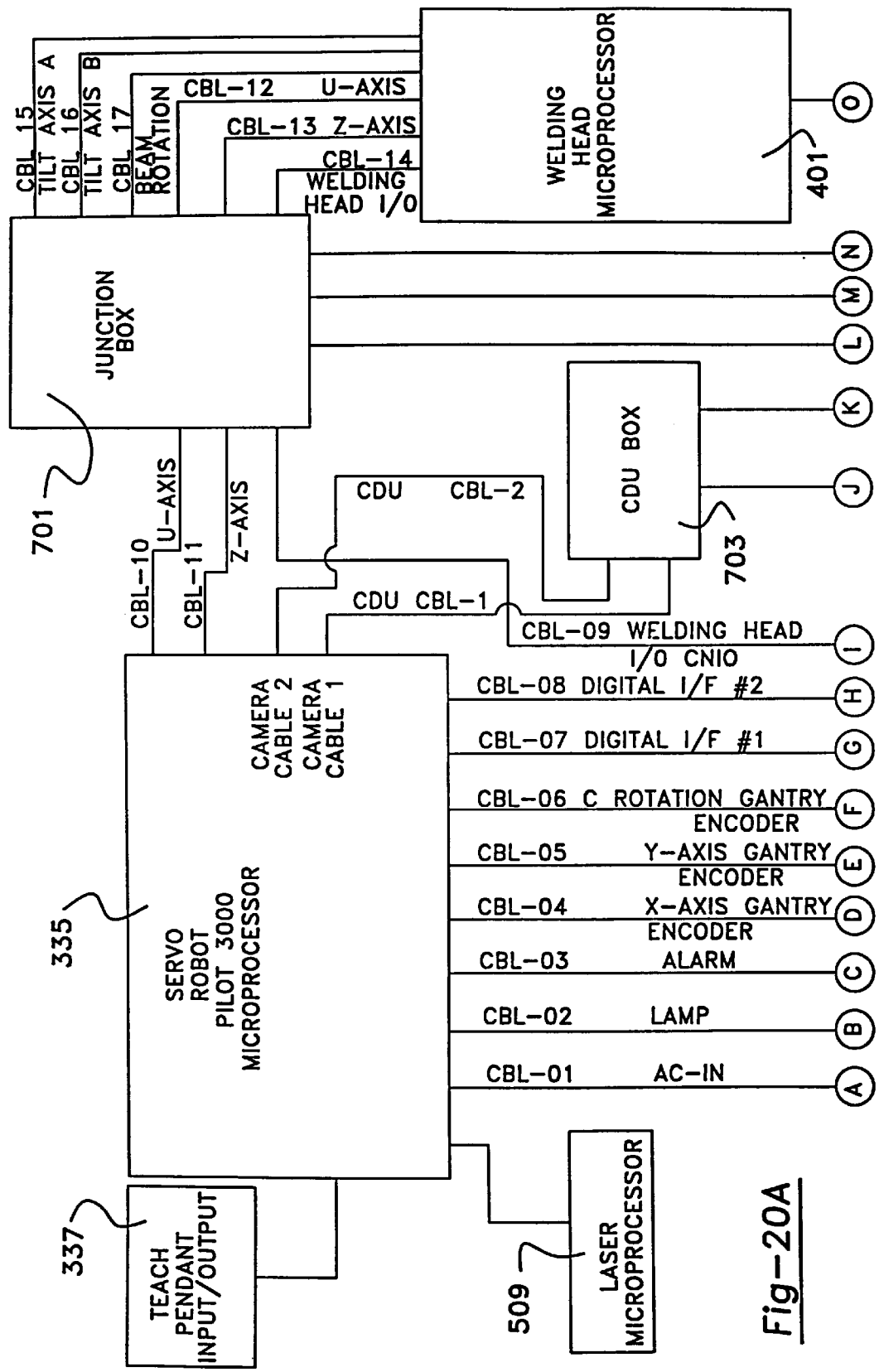
FIGS. 20A and B are electrical schematic diagrams showing the preferred embodiment laser welding apparatus and control system of the present invention.
Figure 20B:
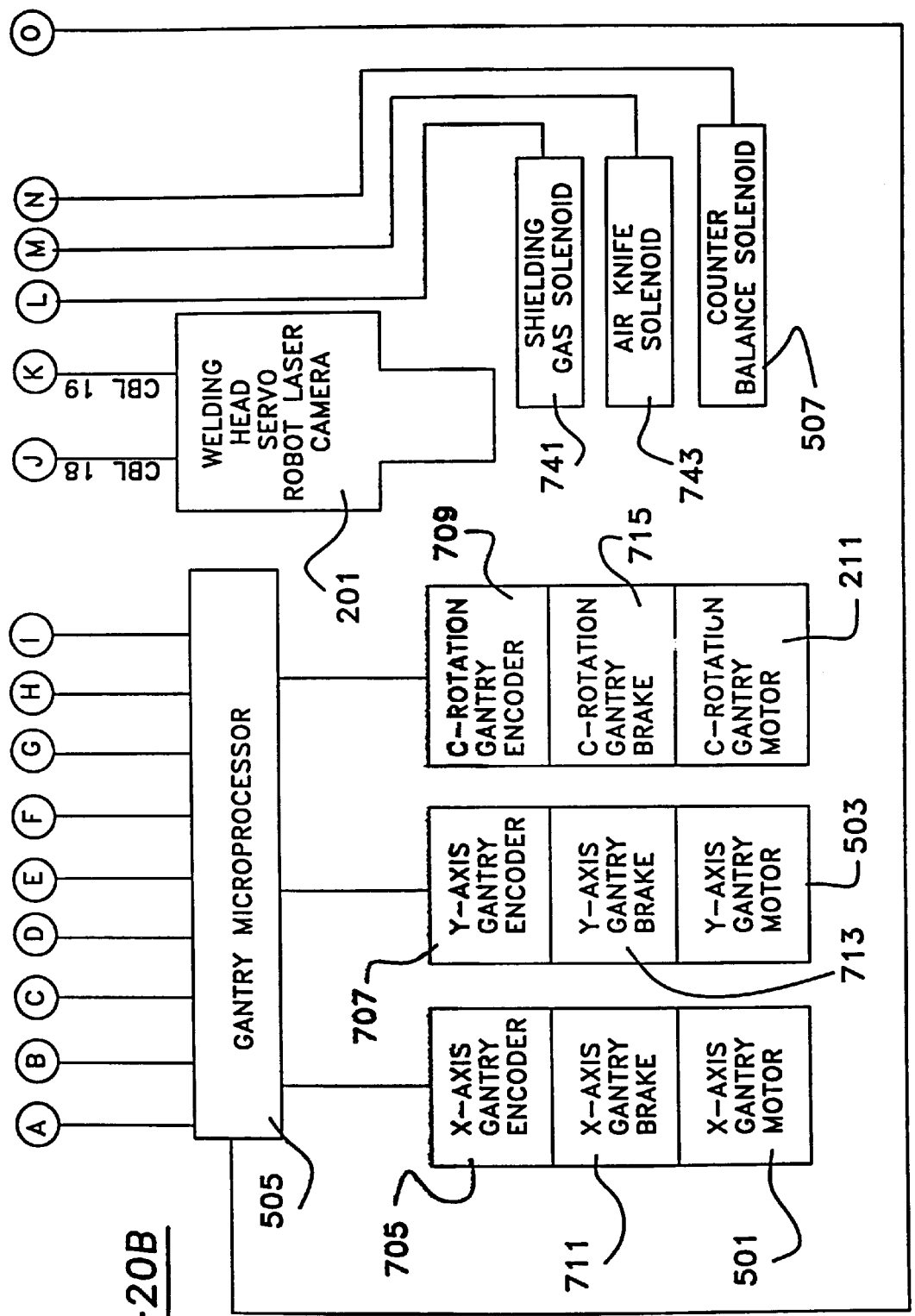
Figure 21:
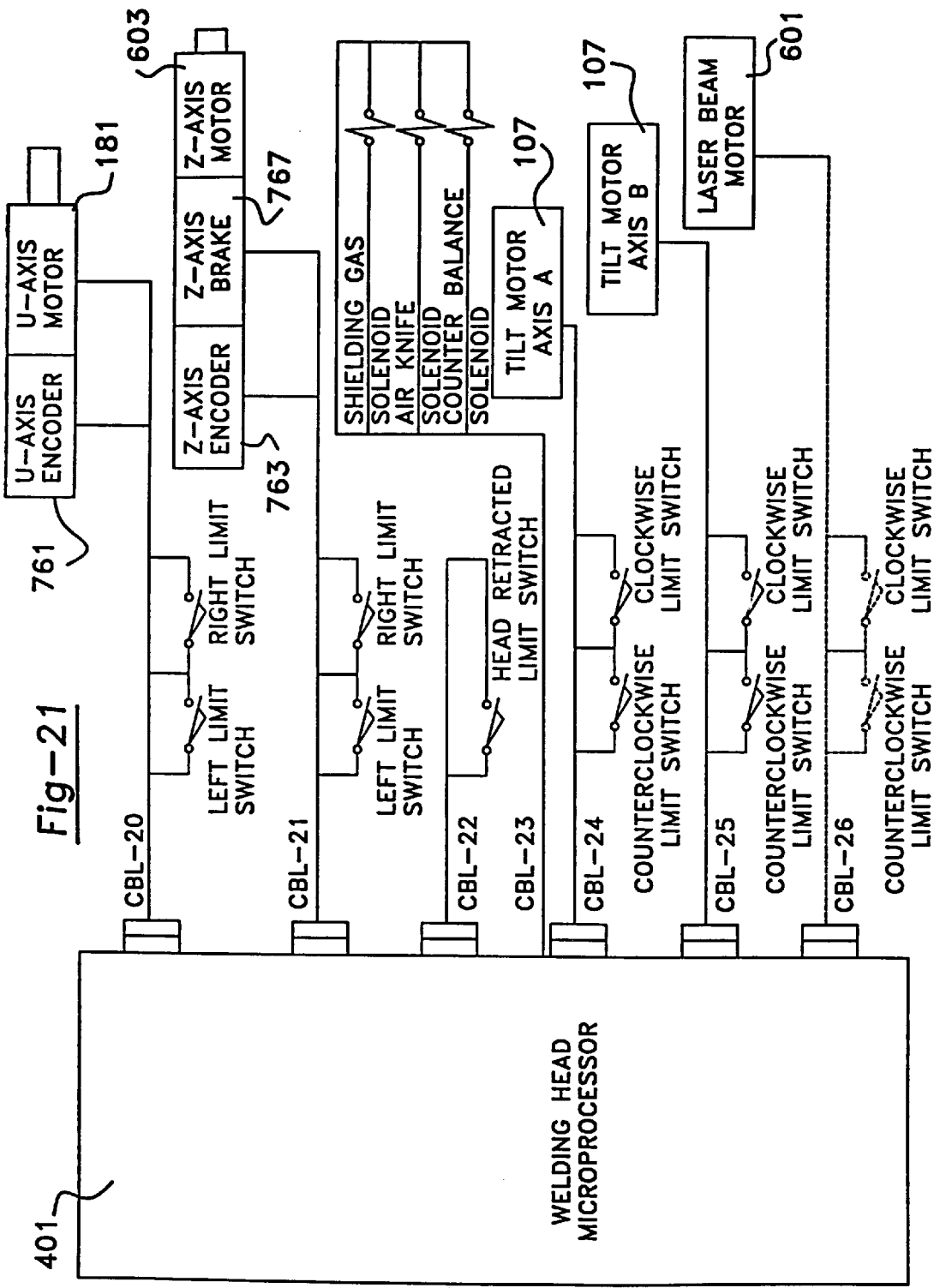
FIG. 21 is an electrical schematic diagram showing the preferred embodiment laser welding apparatus and control system of the present invention.

FIGS. 20A, 20B and 21 show the preferred electrical schematic diagram used to control the present invention laser welding apparatus. Servo-Robot pilot 3000 microprocessor, also known as the laser-camera microprocessor 335 is selectively connected to personal computer 337. Personal computer 337 acts as a teaching pendant and includes a keyboard input device and a LCD output screen. Laser microprocessor 509 is further electrically connected to laser-camera microprocessor 335. Laser-camera microprocessor 335 is also electrically connected to gantry microprocessor 505 by the following circuits or cables: Cable 1 provides alternating current into microprocessor 335; cable 2 provides lamp energization; cable 3 provides a safety alarm electrical interface; cable 4 provides X axis gantry encoder signals, cable 5 provides Y axis gantry encoder signals; cable 6 provides C axis gantry encoder signals; and cables 7 and 8 provide other digital interfaces between microprocessors 335 and 505. Cables 10 and 11 electrically connect laser-camera microprocessor 335 to a junction box 701, for sending and receiving U and Z axis slide signals. Additionally, cable 9 electrically connects junction box to gantry microprocessor. Also, laser-camera microprocessor 335 has CDU cables 1 and 2 electrically connected to a CDU box 703 which acts as an amplifier due to the cable distances between microprocessor 335 and laser-camera 201.

Gantry microprocessor 505 is electrically connected to and controls X, Y and C axis gantry encoders, respectively 705, 707 and 709. These encoders transmit axial speed information based on each respective gantry motor or other separate linear slide movement sensing device by way of a feedback signal based on pulses/time. Gantry microprocessor 505 is also electrically connected to X, Y and C axis gantry brakes, respectively 711, 713 and 715, which act as failsafe mechanical brakes for the device driven by each motor.

A shielding gas solenoid 741 and an air knife solenoid 743 are electrically connected to junction box 701. Junction box 701 is further electrically connected to welding head microprocessor 401 by way of cables 12 through 17.

Cables 20 and 21 electrically connect welding head microprocessor 401 with U and Z axis encoders, respectively 761 and 763, a Z axis brake 767 (cable 21 only), and U and Z axis motors 181 and 603, respectively. Left and right limit switches are part of the cable circuits 20 through 22 and 24 through 26. Cable 22 serves to electrically connect a head retraction limit switch while cable 23 electrically connects welding head microprocessor 401 to shielding gas, air knife and counter balance solenoids. Finally, welding head microprocessor 401 is further electrically connected to tilting motors 107 by way of cables 24 and 25 as well as their limit switches. In the alternate embodiment, cable 26 electrically connects welding head microprocessor 401 to laser beam motor 601 through its respective limit switches.

While the preferred embodiment of this laser welding apparatus has been disclosed, it will be appreciated that various modifications may be made without departing from the present invention. For example, only two goniometers may be required. Furthermore, greater or lesser numbers of plates, brackets and slides can be utilized as long as the laser head is provided with three-dimensional movement capability relative to the gantry. Also, tilting devices other than the disclosed goniometers can be employed as long as the laser is tilted about its focal point. It is also envisioned that the bridge may be stationary while the sheets of material are moved along the weld direction. An adhesive pumping, routing, grinding, milling, inspection or other heads may also employ the tilting mechanism of the present invention. Other electric control units such as MOSFETs, bipolars, or the like, or combined microprocessors can be substituted for the disclosed separated, modular microprocessors. Various materials have been disclosed in an exemplary fashion, however, other materials may of course be employed. It is intended by the following claims to cover these and any other departures from the disclosed embodiments which fall within the true spirit of this invention.

The invention claimed is:

1. An apparatus for working material pieces comprising:
   a laser head operably projecting a laser beam having a focal point by way of a direct path between said laser head and said material pieces, said laser beam operably modifying said material pieces;
   a tilting mechanism being coupled to said laser head such that said laser head is tilted about said focal point along a first plane;
   a second tilting mechanism causing said laser head to tilt about said focal point along a second plane substantially perpendicular to said first plane wherein all of said first tilting mechanism tilts along said second plane corresponding to movement of a portion of said second tilting mechanism; and
   a seam tracking device continuously sensing the positioning of a seam, said laser head substantially following said seam tracking device along said seam.

2. The apparatus of claim 1 further comprising:
   a first plate selectively movable in a vertical direction and a horizontal direction proximate said laser head;
   a driving bearing device of said second tilting mechanism being affixed to said first plate;
   a driven bearing device of said second tilting mechanism being movably engaged to said driving bearing device;
   an automatically controlled actuator causing relative movement of said bearing devices;
   a second plate being affixed to said driven bearing device; and
   a driving bearing device of said first tilting mechanism being affixed to said second plate.

3. The apparatus of claim 2 further comprising a slave tilting mechanism having a driving bearing device affixed to said first plate and having a driven bearing device affixed to said second plate, said slave tilting mechanism being disposed on a substantially opposite side of said laser head from said second tilting mechanism, said slave and second tilting mechanism being oriented substantially parallel to each other and perpendicular to said first tilting mechanism.

4. The apparatus of claim 1 further comprising:
   a U axis substantially horizontal slide being coupled to said tilting mechanism, said U axis slide providing adjustment for centering said laser beam along said U axis; and
   a T axis substantially horizontal slide being coupled to said tilting mechanism and said U axis slide, said T axis slide providing adjustment substantially perpendicular to said U axis for centering said laser beam along said T axis.

5. The apparatus of claim 4 further comprising a Z axis substantially vertical slide adjustably moving said laser head in a vertical direction for focusing said laser beam, said Z axis slide being coupled to said tilting mechanism.

6. The apparatus of claim 1 wherein said tilting mechanism includes:
   a first bearing device being coupled to said laser head;
   a second bearing device engaging with said first bearing device, said first bearing device selectively moving in relation to said second bearing device; and
   said first bearing device having a partially circular engagement surface with a theoretical radius substantially the same as a focal length of said laser beam.

7. The apparatus of claim 6 further comprising:
   a set of teeth being disposed upon said first bearing device, crests of said teeth defining said theoretical radius;
   a screw gear being disposed within said second bearing device for meshed engagement with said set of teeth; and
   an electromagnetic actuator operably driving said screw gear which rotates said first bearing device.

8. The apparatus of claim 1 wherein said laser beam welds said material pieces together in a butt welding manner, said weld is created substantially at said focal point.

9. The apparatus of claim 8 wherein said laser head is tilted such that said material pieces are welded together even if a pre-weld gap dimension greater than 10 percent of a thickness of one of said material pieces is present between adjacent edges of said material pieces.

10. The apparatus of claim 1 further comprising a microprocessor causing said tilting mechanism to tilt said laser head in relation to said material pieces upon receiving an appropriate signal from said seam tracking device.

11. The apparatus of claim 10 wherein said appropriate signal is output from said seam tracking device when a seam gap width value greater than 10 percent of a thickness of one of said material pieces is sensed.

12. The apparatus of claim 1 wherein said laser head is part of a Yag laser having a fiberoptic cable coupling said laser head to a laser light source, said laser beam moves relative to said material pieces free of rotatable mirrors.

13. The apparatus of claim 1 wherein said laser beam cuts said material pieces.

14. The apparatus of claim 1 wherein said seam tracking device includes a light pattern emitter and an optical sensor.

15. An apparatus for working material pieces comprising:
   a laser head operably projecting a laser beam having a focal point by way of a direct path between said laser head and said material pieces, said laser beam operably modifying said material pieces;
   a tilting mechanism being coupled to said laser head such that said laser head is tilted about said focal point alone a first plane; and
   a seam tracking device continuously sensing the positioning of a seam, said laser head substantially following said seam tracking device along said seam;
   a gantry having a movable bridge proximate said laser head;
   a motor-driven rotatable carousel being coupled to said bridge by a rotary bearing; and
   a motor-driven Z axis substantially vertical slide being coupled to said carousel;
   said Z axis slide serving to maintain a focal length of said laser beam as said bridge moves in relation to said material pieces.

* * * * *

UNITED STATES PATENT AND TRADEMARK OFFICE
CERTIFICATE OF CORRECTION

PATENT NO. : 5,925,268
DATED : July 20, 1999
INVENTOR(S) : Britnell

It is certified that error appears in the above-identified patent and that said Letters Patent is hereby corrected as shown below:

Column 1, line 60, "cuffing" should be --cutting--.

Column 5, line 29, "th an" should be --than--.

Column 10, line 3, "Ybased" should be --Y based--.

Column 12, line 23, a comma should be a semicolon;

Column 14, line 52, claim 15, "alone" should be --along--.

Signed and Sealed this

Eighteenth Day of April, 2000

Q. TODD DICKINSON

Attest:

Attesting Officer

Director of Patents and Trademarks